United States Patent
Gidney et al.

(10) Patent No.: US 12,450,514 B2
(45) Date of Patent: Oct. 21, 2025

(54) LOW OVERHEAD QUANTUM COMPUTATION USING LATTICE SURGERY

(71) Applicant: Google LLC, Mountain View, CA (US)

(72) Inventors: Craig Gidney, Goleta, CA (US);
Austin Greig Fowler, Reseda, CA (US)

(73) Assignee: Google LLC, Mountain View, CA (US)

( * ) Notice: Subject to any disclaimer, the term of this patent is extended or adjusted under 35 U.S.C. 154(b) by 1091 days.

(21) Appl. No.: 16/980,592

(22) PCT Filed: Aug. 8, 2019

(86) PCT No.: PCT/US2019/045713
§ 371 (c)(1),
(2) Date: Sep. 14, 2020

(87) PCT Pub. No.: WO2020/033692
PCT Pub. Date: Feb. 13, 2020

(65) Prior Publication Data
US 2021/0374588 A1  Dec. 2, 2021

Related U.S. Application Data

(60) Provisional application No. 62/716,212, filed on Aug. 8, 2018.

(51) Int. Cl.
*G06N 10/20* (2022.01)
*G06N 10/60* (2022.01)
*G06N 10/70* (2022.01)

(52) U.S. Cl.
CPC ............. *G06N 10/60* (2022.01); *G06N 10/20* (2022.01); *G06N 10/70* (2022.01)

(58) Field of Classification Search
CPC ....... G06N 10/00; G06N 10/70; G06F 11/004
See application file for complete search history.

(56) References Cited

U.S. PATENT DOCUMENTS

2015/0115998 A1   4/2015  Eastin
2019/0044543 A1*  2/2019  Chamberland ....... H03M 13/13

OTHER PUBLICATIONS

Fowler, Austin G., et al. "Surface codes: Towards practical large-scale quantum computation." Physical Review A 86.3 (2012): 032324. (Year: 2012).*

Horsman, Dominic, et al. "Surface code quantum computing by lattice surgery." New Journal of Physics 14.12 (2012): 123011. (Year: 2012).*

(Continued)

*Primary Examiner* — Michael J Huntley
*Assistant Examiner* — Sehwan Kim
(74) *Attorney, Agent, or Firm* — Fish & Richardson P.C.

(57) ABSTRACT

Methods, systems, and apparatus for performing low overhead quantum computations using lattice surgery. In one aspect, an apparatus includes a multi-qubit lattice defining a plurality of qubit rows and plurality of qubit columns, comprising: two or more separate row portions of rotated logical qubits, each row portion comprising a plurality of rotated logical qubits that are each adjacent to each other, each rotated logical qubit comprising: a plurality of data qubits, and a plurality of measure qubits; two or more separate row portions of inactive qubits, each row portion defining a plurality of inactive qubits; wherein: each row portion of rotated logical qubits is adjacent a row portion of inactive qubits.

5 Claims, 32 Drawing Sheets

(56) References Cited

OTHER PUBLICATIONS

Paler, Alexandru, et al. "Fault-tolerant, high-level quantum circuits: form, compilation and description." Quantum Science and Technology 2.2 (2017): 025003. (Year: 2017).*
Moussa, Jonathan E. "Transversal Clifford gates on folded surface codes." Physical Review A 94.4 (2016): 042316. (Year: 2016).*
Fowler, Austin G. "Low-overhead surface code logical Hadamard." arXiv preprint arXiv:1202.2639 (2012). (Year: 2012).*
Fowler, Austin G., and Simon J. Devitt. "A bridge to lower overhead quantum computation." arXiv preprint arXiv:1209.0510 (2012). (Year: 2012).*
Herr, Daniel, Franco Nori, and Simon J. Devitt. "Lattice surgery translation for quantum computation." New Journal of physics 19.1 (2017): 013034. (Year: 2017).*
AU Office Action in Australian Application No. 2019316554, dated Jul. 9, 2021, 4 pages.
De Beaudrap et al., "The ZX calculus is a language for surface code lattice surgery," arXiv, Jun. 4, 2020, 20 pages.
Fowler et al., "High-threshold universal quantum computation on the surface code," Physical Review A, Nov. 11, 2009, 14 pages.
Herr et al., "Optimization of lattice surgery is NP-hard," NPJ Quantum Information, Sep. 11, 2017, 3(1):1-5.
Litinski et al., "Braiding by Majorana tracking and long-range CNOT gates with color codes," Physical Review B, Nov. 8, 2017, 96(20):1-11.
Office Action in Australian Appln. No. 2022201673, dated Mar. 2, 2023, 5 pages.
Office Action in Australian Appln. No. 2022201674, dated Mar. 1, 2023, 5 pages.
AU Office Action in Australian Application No. 2019316554, dated May 26, 2022, 3 pages.
Babbush et al., "Encoding electronic spectra in quantum circuits with linear T complexity," Physical Review X, Oct. 2018, 8(4):041015.
Bravyi et al., "Universal quantum computation with ideal Clifford gates and noisy ancillas," Physical Review A., Feb. 2005, 71(2):022316.
Bravyi et al., "Quantum codes on a lattice with boundary," arXiv preprint quant-ph/9811052, Nov. 1998, 6 pages.
Brown et al., "Poking holes and cutting corners to achieve Clifford gates with the surface code," Physical Review X, May 2017, 7(2):021029.
Dennis et al., "Topological quantum memory," Journal of Mathematical Physics, Sep. 2002, 43(9):4452-505.
Fowler et al., "Low overhead quantum computation using lattice surgery," arXiv preprint arXiv:1808.06709, Aug. 2018, 15 pages.
Fowler et al., "Optimal complexity correction of correlated errors in the surface code," arXiv preprint arXiv:1310.0863, Oct. 2013, 6 pages.
Fowler et al., "Surface code quantum error correction incorporating accurate error propagation," arXiv preprint arXiv:1004.0255, Apr. 2010, 7 pages.
Fowler et al., "Surface codes: Towards practical large-scale quantum computation," Physical Review A., Sep. 2012, 86(3):032324.
Herr et al., "Lattice surgery translation for quantum computation," new journal of physics, Jan. 2017, 19(1):013034.
Horsman et al., "Surface code quantum computing by lattice surgery," New journal of physics, Dec. 2012, 14(12):123011.
Li, "A magic state's fidelity can be superior to the operations that created it," New Journal of Physics, Feb. 2015, 17(2):023037.
Litinski et al., "Lattice surgery with a twist: simplifying clifford gates of surface codes," Quantum, May 2018, 2:62.
PCT International Search Report and Written Opinion in International Appln. No. PCT/US2019/045713, dated Nov. 26, 2019, 18 pages.
Raussendorf et al., "Fault-tolerant quantum computation with high threshold in two dimensions. Physical review letters," May 2007, 98(19):190504.
Raussendorf et al., "Topological fault-tolerance in cluster state quantum computation," New Journal of Physics, Jun. 2007, 9(6):199.
Reichardt et al., "Quantum universality from magic states distillation applied to CSS codes," Quant. Info. Proc., 2005, arXiv preprint quant-ph/0411036.
CA Office Action in Canadian Application No. 3,094,740, dated Oct. 6, 2021, 3 pages.
CA Office Action in Canadian Appln. No. 3,094,740, dated Nov. 2, 2022, 5 pages.
Notice of Allowance in Australian Appln. No. 2022201674, mailed on Jan. 31, 2024, 3 pages.
Office Action in Australian Appln. No. 2022201673, mailed on Feb. 28, 2024, 3 pages.
Office Action in Canada Appln. No. 3,191,651, mailed on Dec. 4, 2024, 5 pages.
Office Action in Canadian Appln. No. 3,191,697, mailed on Feb. 28, 2025, 5 pages.
Notice of Allowance in Australian Appln. No. 2024203107, mailed on Apr. 9, 2025, 3 pages.

* cited by examiner

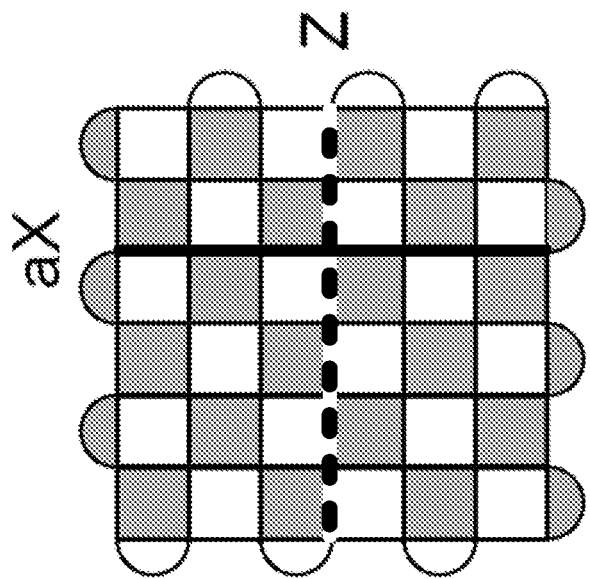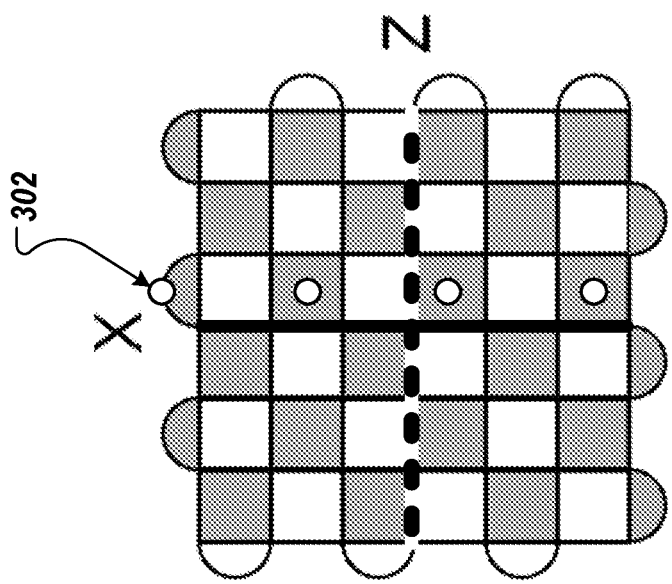
FIG. 3

400

```
┌─────────────────────────────────────────────────────────┐
│ Merge n logical qubits by preparing physical qubits     │
│ located between the logical qubits in a zero state and  │
│ treating the logical qubits and physical qubits as a    │
│ single surface                                      402 │
└─────────────────────────────────────────────────────────┘
                            │
                            ▼
┌─────────────────────────────────────────────────────────┐
│ Repeatedly calculate product of stabilizers on the      │
│ single surface to determine an eigenvalue of the n-body │
│ operator                                            404 │
└─────────────────────────────────────────────────────────┘
                            │
                            ▼
┌─────────────────────────────────────────────────────────┐
│ Modify the eigenvalue using current signs of individual │
│ logical operators in the n-body operator                │
│                                                     406 │
└─────────────────────────────────────────────────────────┘
                            │
                            ▼
┌─────────────────────────────────────────────────────────┐
│ Split the n logical qubits                          408 │
└─────────────────────────────────────────────────────────┘
```

FIG. 4

LOW OVERHEAD QUANTUM COMPUTATION USING LATTICE SURGERY

CROSS-REFERENCE TO RELATED APPLICATION

This application is a National Stage Application under 35 U.S.C. § 371 and claims the benefit of International Application No. PCT/US2019/045713, filed Aug. 8, 2019, which claims priority to U.S. Application No. 62/716,212, filed Aug. 8, 2018, the disclosure of which is incorporated herein by reference.

BACKGROUND

This specification relates to quantum computing.

SUMMARY

This specification describes technologies for performing quantum algorithms using fewer qubits and less time using lattice surgery techniques.

One innovative aspect of the subject matter described in this specification can be implemented in an apparatus for implementing an arbitrary quantum algorithm, wherein the arbitrary quantum algorithm is made fault-tolerant using the surface code, the apparatus comprising: a multi-qubit lattice defining a plurality of qubit rows and plurality of qubit columns, comprising: two or more separate row portions of rotated logical qubits, each row portion comprising a plurality of rotated logical qubits that are each adjacent to each other, each rotated logical qubit comprising: a plurality of data qubits, and a plurality of measure qubits; two or more separate row portions of inactive qubits, each row portion defining a plurality of inactive qubits; wherein: each row portion of rotated logical qubits is adjacent a row portion of inactive qubits.

The foregoing and other implementations can each optionally include one or more of the following features, alone or in combination. Each row portion of rotated logical qubits may be a proper subset of a qubit row, and the qubit row may include one or more inactive qubits, and wherein the one or more inactive qubits may form columns across two or more qubit rows.

Each rotated logical qubit may comprise: a plurality of X stabilizers; a plurality of Z stabilizers interleaving the plurality of X stabilizers; wherein: each stabilizer is associated with a respective measurement qubit; and data qubits are located at intersections between stabilizers.

The plurality of data qubits may comprise $d^2$ data qubits and the plurality of measure qubits may comprise $d^2-1$ measure qubits, where d represents surface code distance that measures the strength of the code and represents the length of the smallest logical operator.

Each rotated logical qubit may require $3d^2$ qubits to leading order, with $d^2$ qubits representing space for communication, interaction and manipulation.

The one or more rotated logical qubits may be configured to be acted on locally.

The one or more rotated logical qubits may be operated in a shared workspace and may be configured to participate in multi-logical-qubit operations.

The logical qubits may be configured to be rotated in place.

The arbitrary quantum algorithm may comprise a Clifford+T algorithm.

Another innovative aspect of the subject matter described in this specification can be implemented in a method for measuring a n-body operator O as part of an arbitrary quantum algorithm, the method comprising: merging n logical qubits, comprising: preparing each of a plurality of physical qubits located between the n logical qubits in a zero state; treating the logical qubits and plurality of physical qubits as a single surface, repeatedly calculating a product of stabilizers on the single surface to determine an eigenvalue of the operator O and modifying the eigenvalue using current signs of individual logical operators in the operator O; splitting the n logical qubits.

Other implementations of this aspect include corresponding computer systems, apparatus, and computer programs recorded on one or more computer storage devices, each configured to perform the actions of the methods. A system of one or more classical and/or quantum computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. The n-body operator O may comprise an n-body Pauli X or n-body Pauli Z operator. The n-body operator O may comprise a mixed n-body operator.

Repeatedly may comprise d times, wherein d represents code distance.

The arbitrary quantum algorithm may comprise a Clifford+T algorithm.

Another innovative aspect of the subject matter described in this specification can be implemented in a method for distilling one or more T states as part of an arbitrary quantum algorithm, the method comprising: initializing n qubits, comprising: initializing a nonzero strict subset of k qubits in a plus state; and initializing (n–k) qubits in a zero state; using lattice surgery to perform k multi-body stabilizer measurements on the initialized qubits, wherein each multi-body stabilizer measurement is defined by a respective column of CNOT gates in a T state distillation circuit, selecting one of the qubits from the qubits initialized in a plus state; for each qubit that is not the selected qubit: applying a T gate or its Hermitian conjugate to the qubit; applying a single qubit measurement operation to the qubit; and applying a Z gate to the selected qubit by operating on a surface patch or recording in classical software the presence of byproduct operators on outputs determined from the single qubit measurement results.

Other implementations of this aspect include corresponding computer systems, apparatus, and computer programs recorded on one or more computer storage devices, each configured to perform the actions of the methods. A system of one or more classical and/or quantum computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. The method may further comprise repeating T state distillation, wherein in each repetition a corresponding T state distillation circuit is chosen such that a last column of CNOTs in a previous repetition slots into a first column of CNOTS for a current repetition.

The qubits are logical qubits may comprise rotated logical qubits.

Applying a T gate or its Hermitian conjugate to the qubit may comprise: obtaining an ancilla qubit in a T state; performing a 2-body ZZ measurement on the T state and the qubit; conditioned on the result of the ZZ measurement, performing an S gate or its Hermitian conjugate on the qubit; performing a X measurement on the ancilla qubit; and conditioned on the result of the X measurement, performing or classically recording the presence of a Z operation on the qubit.

The arbitrary quantum algorithm may comprise a Clifford+T algorithm.

The subject matter described in this specification can be implemented in particular ways so as to realize one or more of the following advantages A system implementing the presently described techniques surgery can achieve a reduction in storage overhead by over a factor of 4 and a reduction in state distillation overhead by nearly a factor of 5. Such reductions provide increased efficiency of implementations quantum algorithms. For example, quantum algorithms that require $10^8$ T gates can be run using only $3.7 \times 10^5$ physical qubits capable of executing gates with error $p \sim 10^{-3}$. In addition, the presently described techniques provide an improved alternative to previous methods that use defects and braids for logical qubit storage and state distillation.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 illustrates an example movement of a logical operator X.

FIG. 4 is a flow diagram of an example process for measuring an n-body operator as part of an arbitrary quantum algorithm.

Like reference numbers and designations in the various drawings indicate like elements.

DETAILED DESCRIPTION

This specification describes lattice surgery techniques for implementing arbitrary quantum algorithms and calculating algorithm time and space overhead.

Example Apparatus: Logical Qubit Storage

Figure 1:
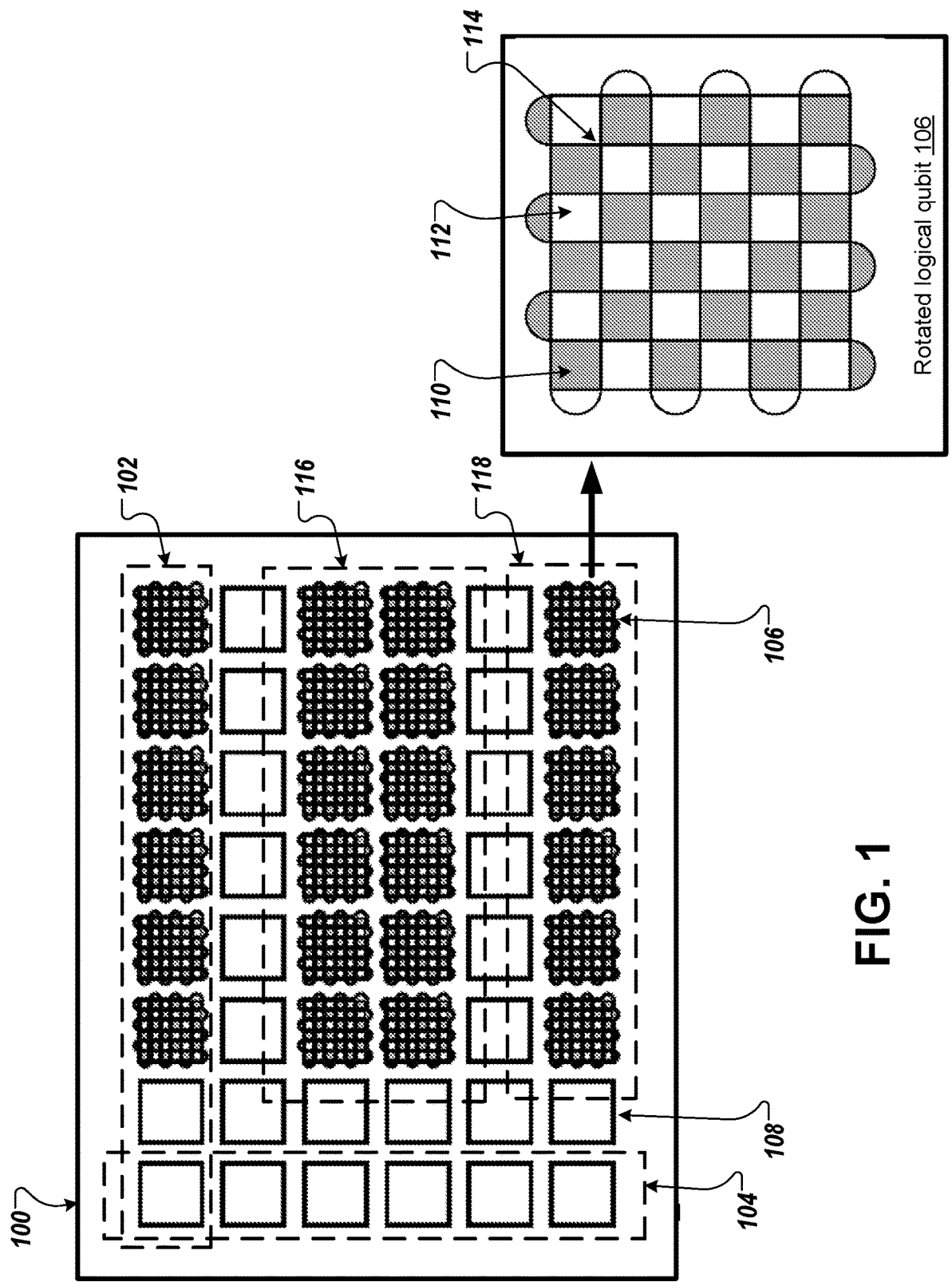
FIG. 1 shows a schematic of an example apparatus for implementing a quantum algorithm.

FIG. 1 is a diagram of an example apparatus for implementing a quantum algorithm. The quantum algorithm can be an arbitrary quantum algorithm, e.g., a Clifford+T algorithm, and can be an algorithm that is made fault-tolerant using the surface code.

The apparatus includes a multi-qubit lattice, e.g., example multi-qubit lattice 100. The multi-qubit lattice defines multiple qubit rows, e.g., row 102, and multiple qubit columns, e.g., column 104. Example multi-qubit lattice 100 includes six rows of qubits and eight columns of qubits, however in some implementations the apparatus can include more or fewer rows and/or columns of qubits.

Qubits included in the multi-qubit lattice include rotated logical qubits, e.g., qubit 106, and inactive qubits, e.g., qubit 108. Each rotated logical qubit includes multiple data qubits and multiple measure qubits. For example, each rotated logical qubit can include $d^2$ data qubits and $d^2-1$ measure qubits, where d represents surface code distance that measures the strength of the code and represents the length of the smallest logical operator. As an example, rotated logical qubit 106 is a distance d=7 rotated logical qubit. In example rotated logical qubit 106, dark regions, e.g., region 110, represent X stabilizers and light regions, e.g., region 112, represent Z stabilizers. In any size rotated logical qubit, the Z stabilizers interleave the plurality of X stabilizers. Each region is associated with a measurement qubit and a data qubit is located at each intersection point of dark lines, e.g., at intersection 114. Rotated logical qubits are configured to be rotated in place.

The multi-qubit lattice includes two or more separate row portions of rotated logical qubits, where each row portion includes multiple rotated logical qubits that are each adjacent to each other. Each row portion of rotated logical qubits is a proper subset of a qubit row, and the qubit row includes one or more inactive qubits, where the one or more inactive qubits form columns across two or more qubit rows.

As a non-limiting example, example multi-qubit lattice 100 includes a first row portion 116 that includes multiple rotated logical qubits that are each adjacent to each other and a second row portion 118 that includes multiple rotated logical qubits that are each adjacent to each other, where the first portion and second portion are separate from one another.

The multi-qubit lattice further includes two or more separate row portions of inactive qubits, where each row portion includes a plurality of inactive qubits.

As a non-limiting example, example multi-qubit lattice 100 includes two separate row portions of inactive qubits—a first row portion between row 102 and row portion 116 and a second row portion between row portion 116 and row portion 118. By construction, each row portion of rotated logical qubits is adjacent a row portion of inactive qubits. Two row portions of rotated logical qubits can be adjacent a same row portion of inactive qubits.

The arrangement of qubits in the multi-qubit lattice enable logical qubits to be acted on locally and in parallel. In addition, the arrangement of qubits enable logical qubits to be easily moved to and operated on in a shared workspace if required, e.g., to participate in multi-logical-qubit operations. To leading order, $3d^2$ physical qubits are required per logical qubit—better than a factor of 4 overhead saving—and $d^2$ qubits represents space for communication, interaction and manipulation.

Example Method for Logical Initialization

Figure 2:
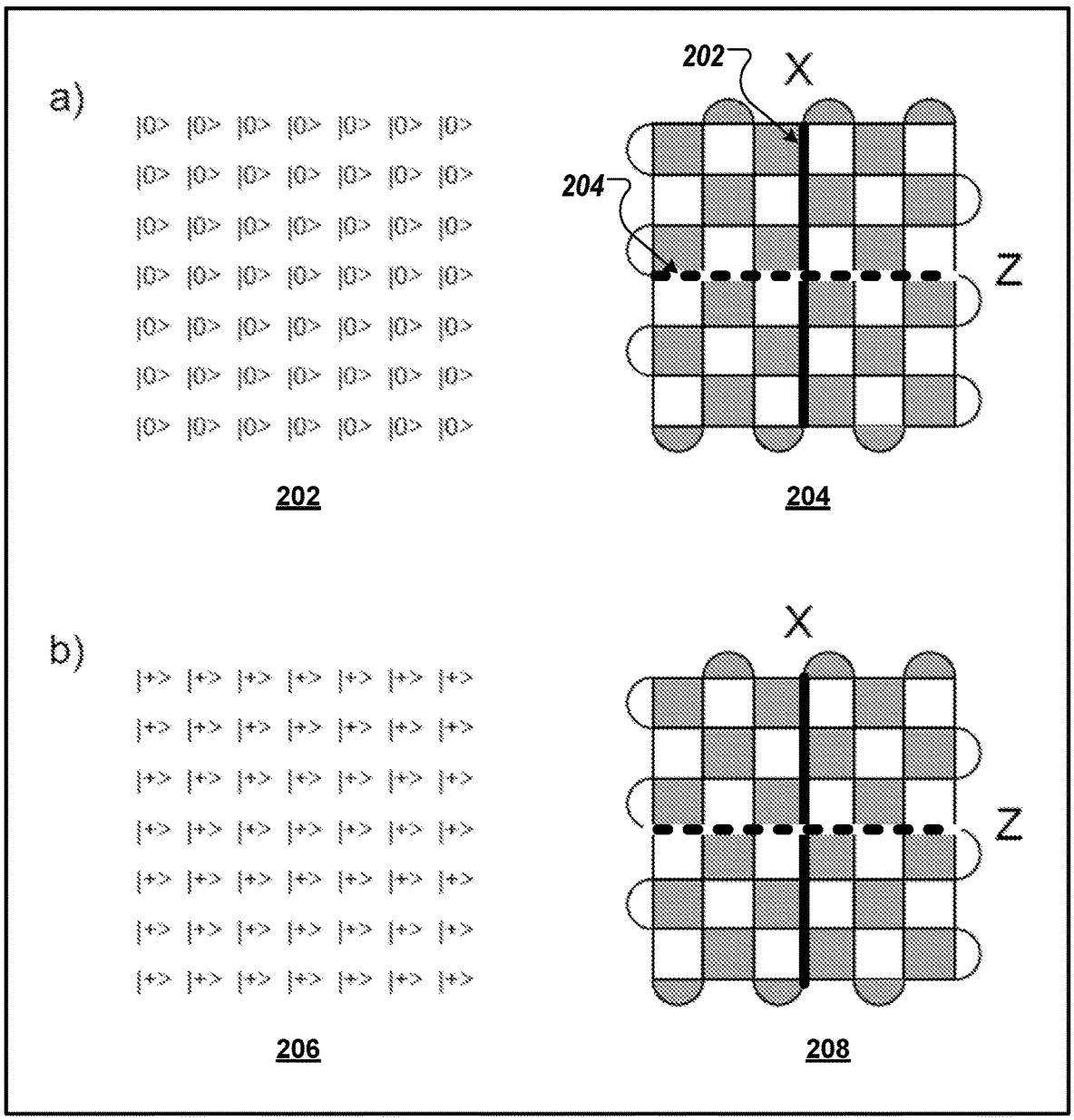
FIG. 2 illustrates an example preparation of a rotated logical qubit in a logical zero state or a plus state.

FIG. 2 illustrates an example preparation of a rotated logical qubit, e.g., a rotated logical qubit as described above with reference to FIG. 1, in a logical zero state $|0_L\rangle$ or a plus state $|+_L\rangle$. To prepare a logical zero state, as shown in part a) of FIG. 2, each data qubit included in the rotated logical qubit is initialized in a zero state (step 202). Then, X, Z stabilizer measurements are performed d times over the code distance d (step 204). Similarly, to prepare a logical zero state, as shown in part b) of FIG. 2, each data qubit included in the rotated logical qubit is initialized in a zero state (step 206). Then, X, Z stabilizer measurements are performed d times over the code distance d (step 208). Logical Z or X measurements can be performed by measuring each data qubit in the Z or X basis and, after correction, taking the product of these ±1 values along each horizontal and vertical lines, e.g., lines 202 and 204, with final modification by any sign accumulated through operator movement or manipulation to obtain the actual result.

After a rotated logical qubit has been prepared in a zero or plus state, logical operators can be moved around using products of stabilizers. FIG. 3 illustrates an example movement of a logical operator X. Part a) shows the rotated logical qubit before movement, where circles, e.g., circle 302 represent a ±1 measurement result of a respective stabilizer measurement. Part b) shows the rotated logical qubit after movement, where the new logical operator is related by the previous logical operator by a, where a represents the product of the ±1 measurement results of the stabilizers.

Example Method for Logical Measurement

FIG. 4 is a flow diagram of an example process 400 for measuring an n-body operator as part of an arbitrary quantum algorithm, e.g., a Clifford+T algorithm. For example, the n-body operator can be a n-body Pauli X operator, a n-body Pauli Z operator, or a mixed n-body operator. The method is particularly suited to use in a multi-qubit lattice, such as the planar lattice described above in relation to FIG. 1.

For convenience, the process 400 will be described as being performed by a system of one or more classical and quantum computing devices located in one or more locations.

The system merges n logical qubits (step 402). The system merges the n logical qubits by preparing each of multiple physical qubits located between the n logical qubits in a zero state and treating the logical qubits and multiple physical qubits as a single surface in the surface code. The number and layout of physical qubits located between the n logical qubits is dependent on the particular layout of the quantum device performing the arbitrary quantum algorithm and can vary.

The system repeatedly calculates a product of stabilizers on the single surface to determine an eigenvalue of the n-body operator (step 404). In some implementations repeatedly calculating the product of stabilizers on the single surface to determine an eigenvalue of the n-body operator can include calculating the product of stabilizers on the single surface d times, where d represents code distance.

The system modifies the eigenvalue using current signs of individual logical operators in the n-body operator (step 406). For example, the system can determine a current sign of tensor products of logical operators corresponding to the product of stabilizers on the single surface and multiply the eigenvalue by the determined current sign.

The system splits the merged logical qubits into n logical qubits (step 408). That is, the system recovers the n logical qubits described above with reference to step 402.

In some implementations example process 400 may be performed post error correction.

Figure 5:
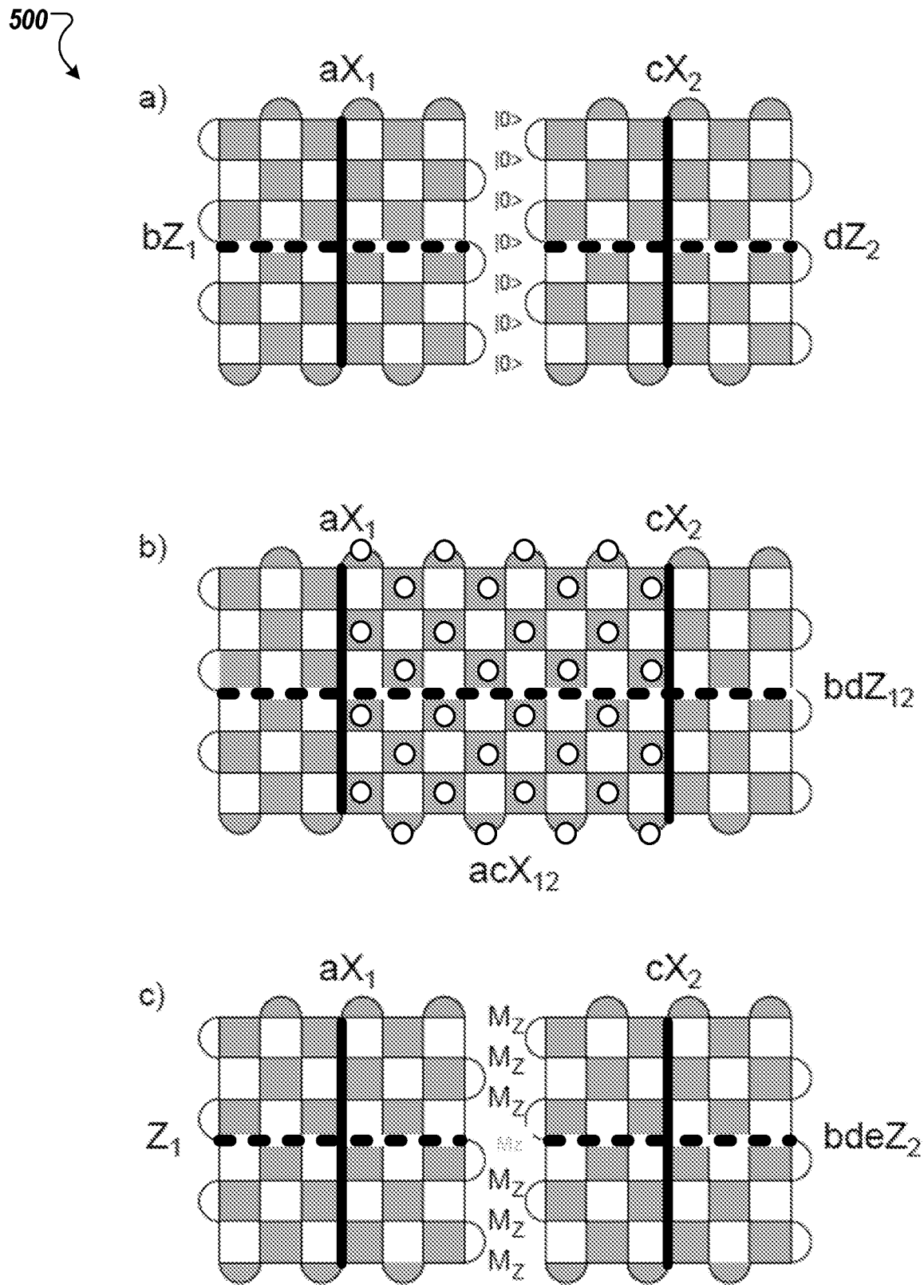
FIG. 5 illustrates an example process for measuring a 2-body logical operator $X_{12}=X_1X_2$ given rotated logical qubits of equal size.

FIG. 5 illustrates steps of an example process 500 for measuring a 2-body logical operator $X_{12}=X_1X_2$ given rotated logical qubits of equal size.

Step a) corresponds to part of step 402 described above with reference to FIG. 4. In example process 500, seven physical qubits are located between 2 logical qubits are prepared in a zero state prior to merging, however a larger number of physical qubits could also be located between the two rotated logical qubits.

Step b) corresponds to steps 404 and 406 described above with reference to FIG. 4. The product of the stabilizers marked by circles gives the eigenvalue of the tensor product of X operators along the vertical solid lines. The eigenvalue must then be modified by the current signs of tensor products of operators along these lines to give a target result. This pattern of stabilizers is measured d times.

Step c) corresponds to step 408 described above with reference to FIG. 4. After splitting, the eigenvalue of the measurement $M_z$ in grey is denoted by e, and this and the sign of the $Z_{12}$ operator can be associated with either $Z_1$ or $Z_2$. In FIG. 5, the eigenvalue and the sign of the $Z_{12}$ operator are associated with $Z_2$.

Figure 6:
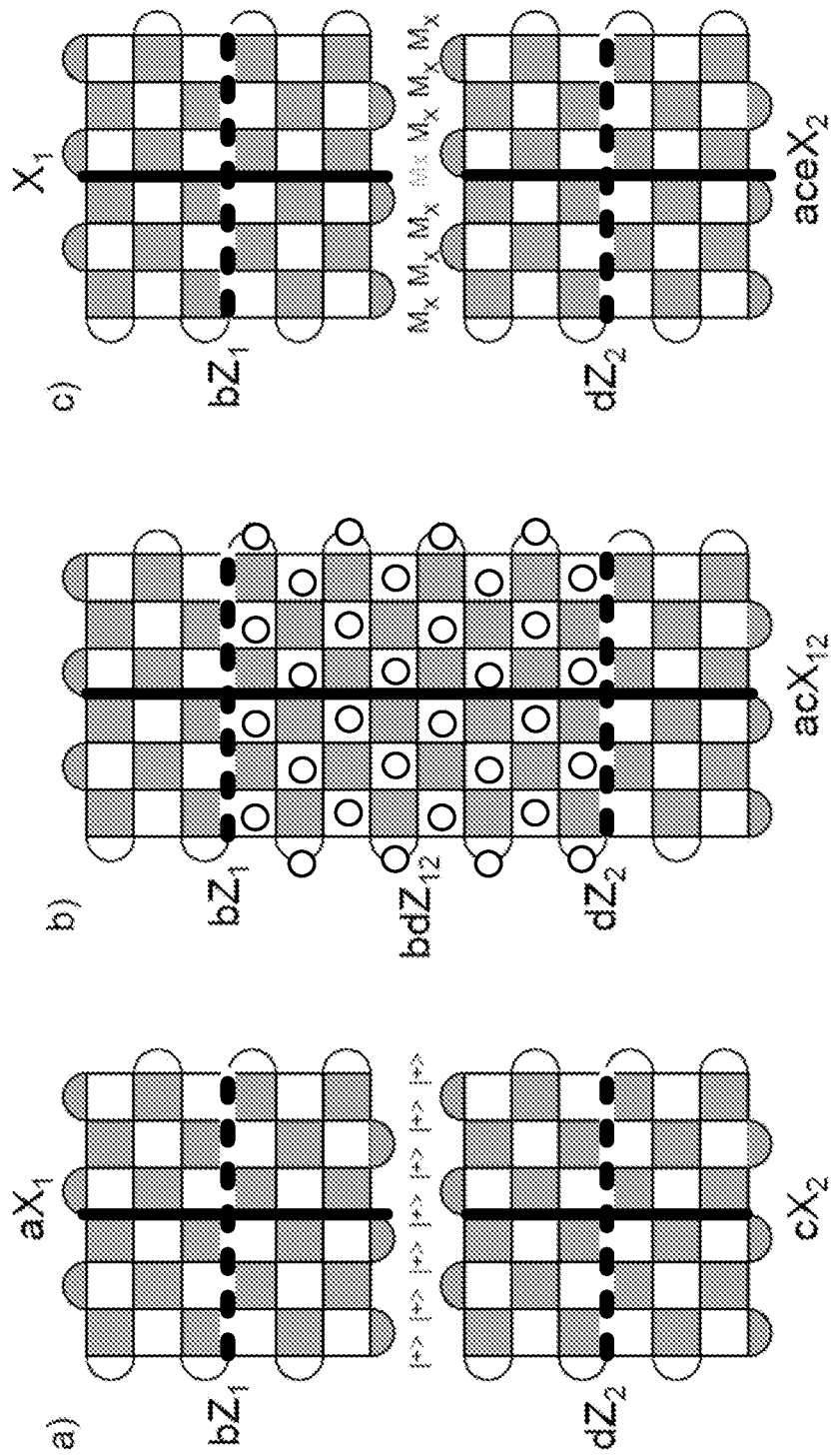
FIG. 6 illustrates an example process for measuring a 2-body logical operator $Z_{12}=Z_1Z_2$. given rotated logical qubits of equal size.

FIG. 6 illustrates an example process 600 for measuring a 2-body logical operator $Z_{12}=Z_1Z_2$. given rotated logical qubits of equal size.

Step a) corresponds to part of step 402 described above with reference to FIG. 4. In example process 600, seven physical qubits are located between 2 logical qubits are prepared in a zero state prior to merging, however in some implementations a larger number of physical qubits could also be located between the two rotated logical qubits.

Step b) corresponds to steps 404 and 406 described above with reference to FIG. 4. The product of the stabilizers marked by circles gives the eigenvalue of the tensor product of Z operators along the horizontal dashed lines. The eigenvalue must then be modified by the current signs of tensor products of operators along these lines to give a target result. This pattern of stabilizers is measured d times.

Step c) corresponds to step 408 described above with reference to FIG. 4. After splitting, the eigenvalue of the measurement $M_z$ in grey is denoted by e, and this and the sign of the $X_{12}$ operator can be associated with either $X_1$ or $X_2$. In FIG. 5, the eigenvalue and the sign of the X operator are associated with $X_2$.

Figure 7A:
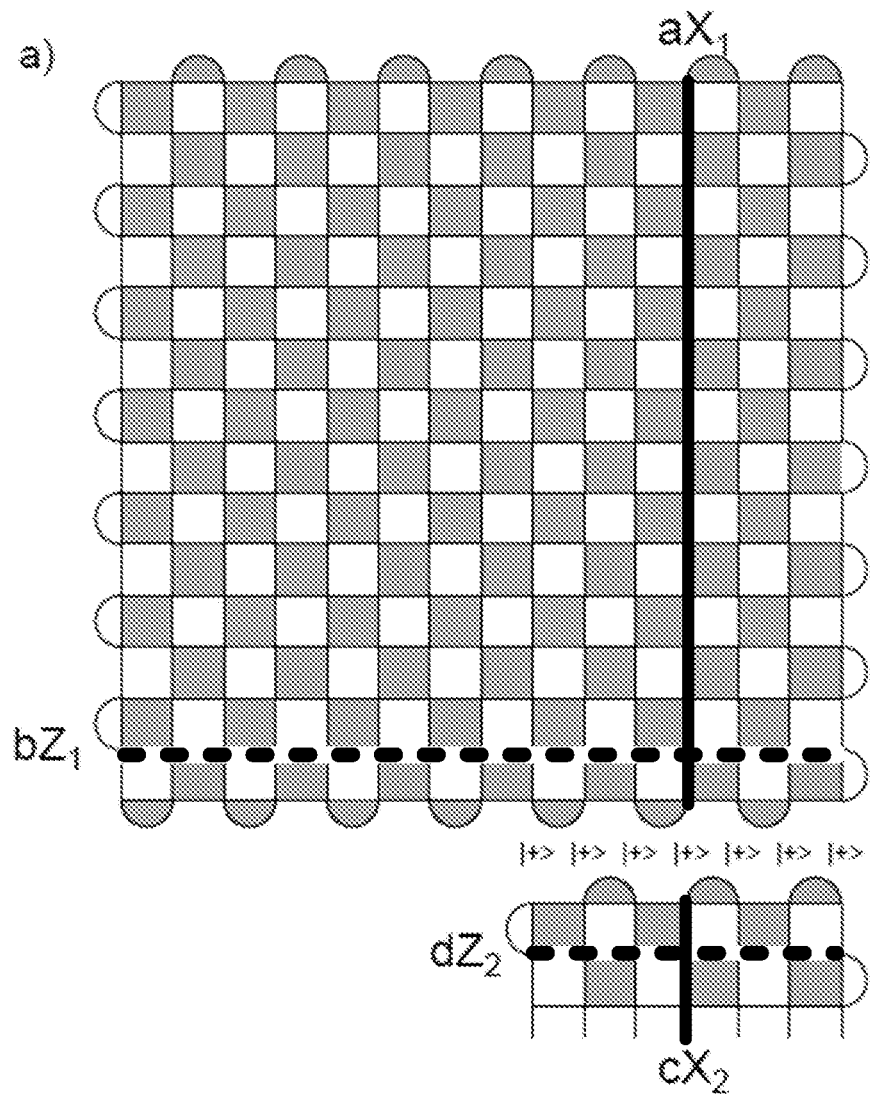
FIGS. 7A-7C illustrate an example process for measuring a 2-body logical operator $Z_{12}=Z_1Z_2$. given rotated logical qubits of different size.
Figure 7B:
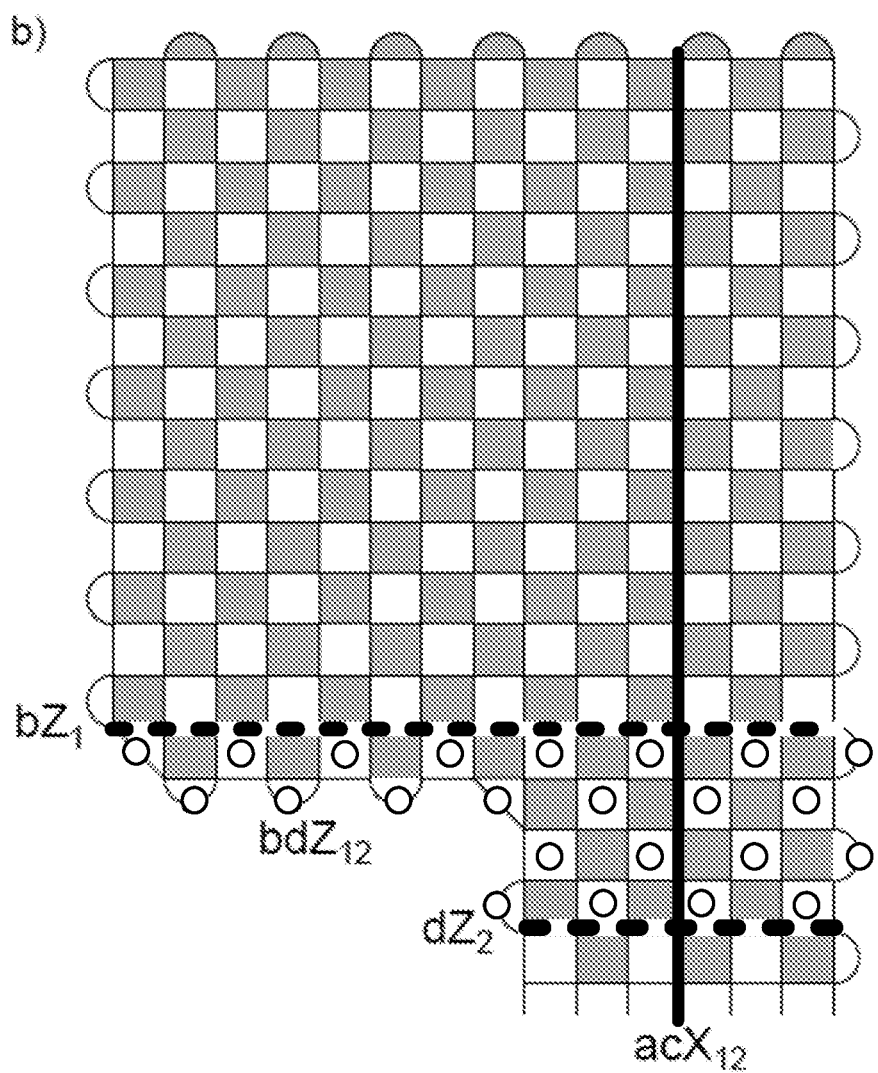
Figure 7C:
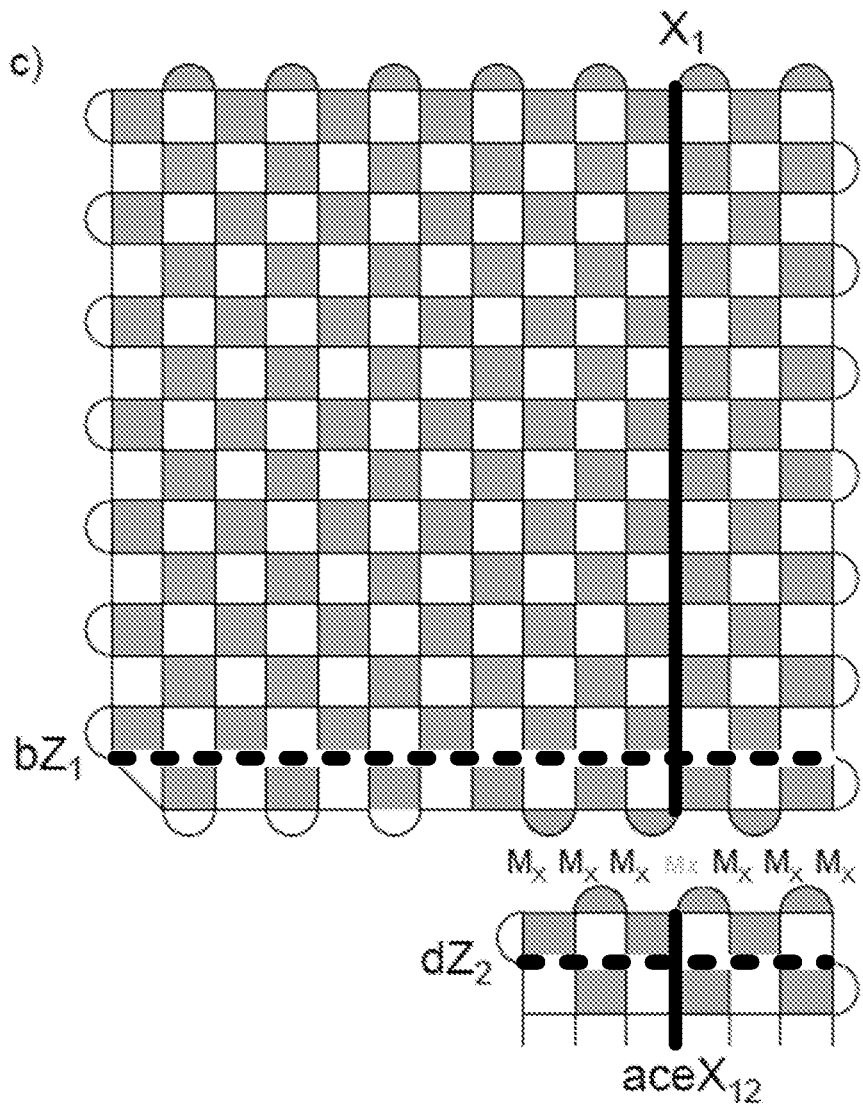

FIGS. 7A-7C illustrates an example process for measuring a 2-body logical operator $Z_{12}=Z_1Z_2$. given rotated logical qubits of different size.

FIG. 7A corresponds to part of step 402 described above with reference to FIG. 4. In the example process, seven physical qubits (corresponding to the size of the smaller rotated logical qubit) are located between 2 logical qubits are prepared in a zero state prior to merging, however a larger number of physical qubits could also be located between the two rotated logical qubits.

FIG. 7B corresponds to steps 404 and 406 described above with reference to FIG. 4. The product of the stabilizers marked by circles gives the eigenvalue of the tensor product of Z operators along the horizontal dashed lines. The eigenvalue must then be modified by the current signs of tensor products of operators along these lines to give a target result. This pattern of stabilizers is measured d times.

FIG. 7C corresponds to step 408 described above with reference to FIG. 4. After splitting, the eigenvalue of the measurement $M_z$ in grey is denoted by e, and this and the sign of the $X_{12}$ operator can be associated with either $X_1$ or $X_2$. In FIG. 5, the eigenvalue and the sign of the X operator are associated with $X_2$.

Figure 8A:
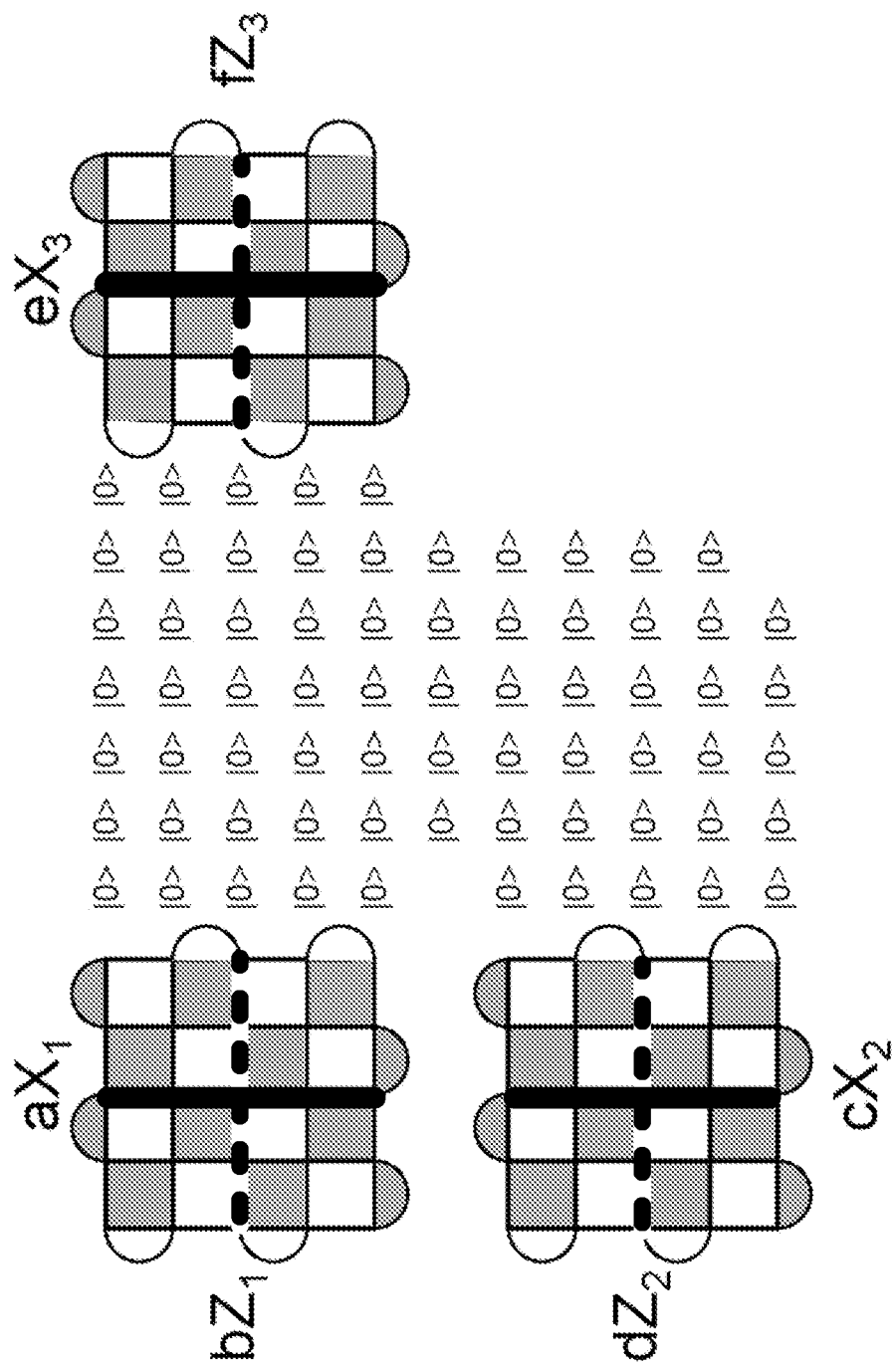
FIGS. 8A-8C illustrate an example process for compactly measuring a multi-body logical operator $X_{123}=X_1X_2X_3$.
Figure 8B:
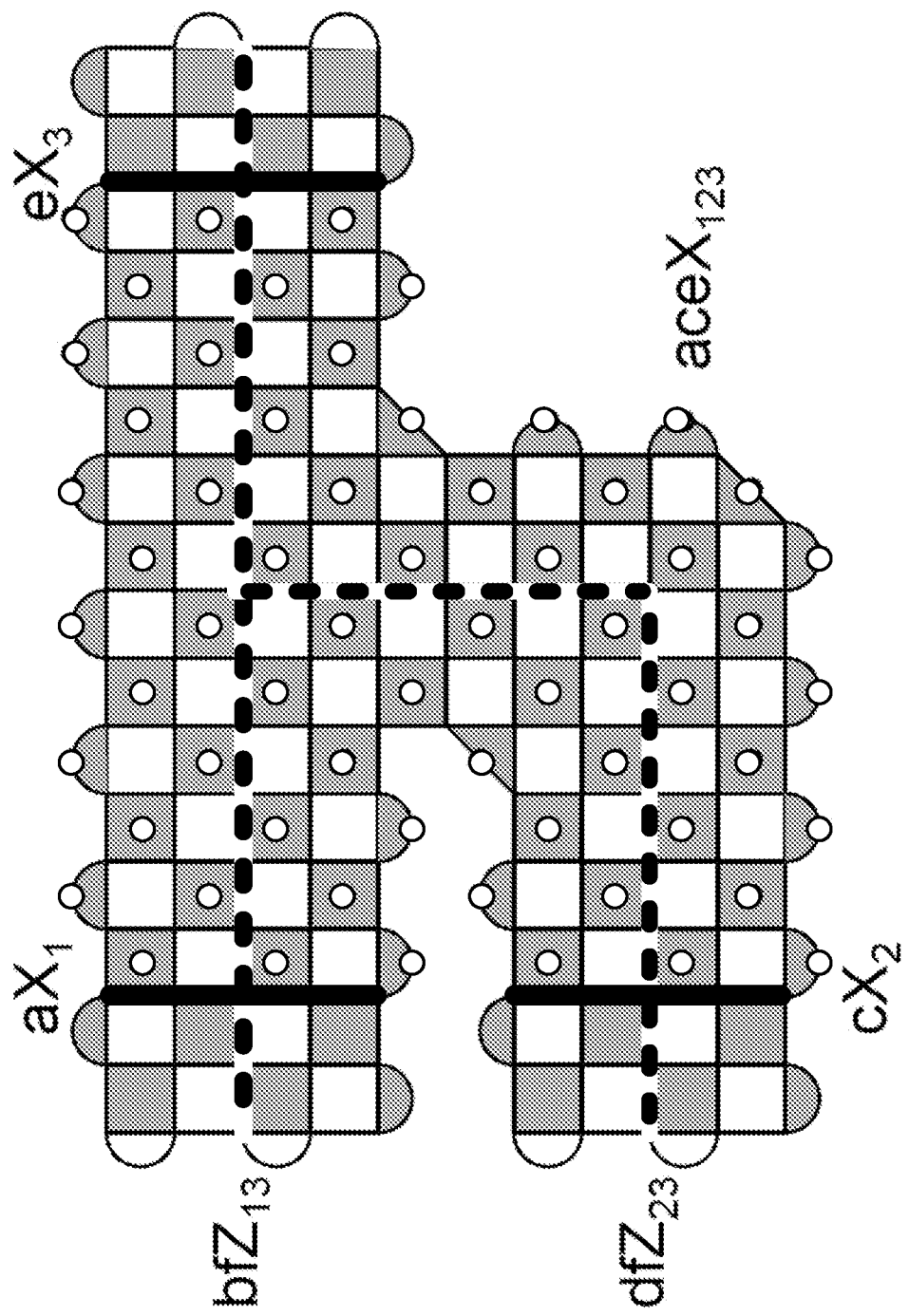
Figure 8C:
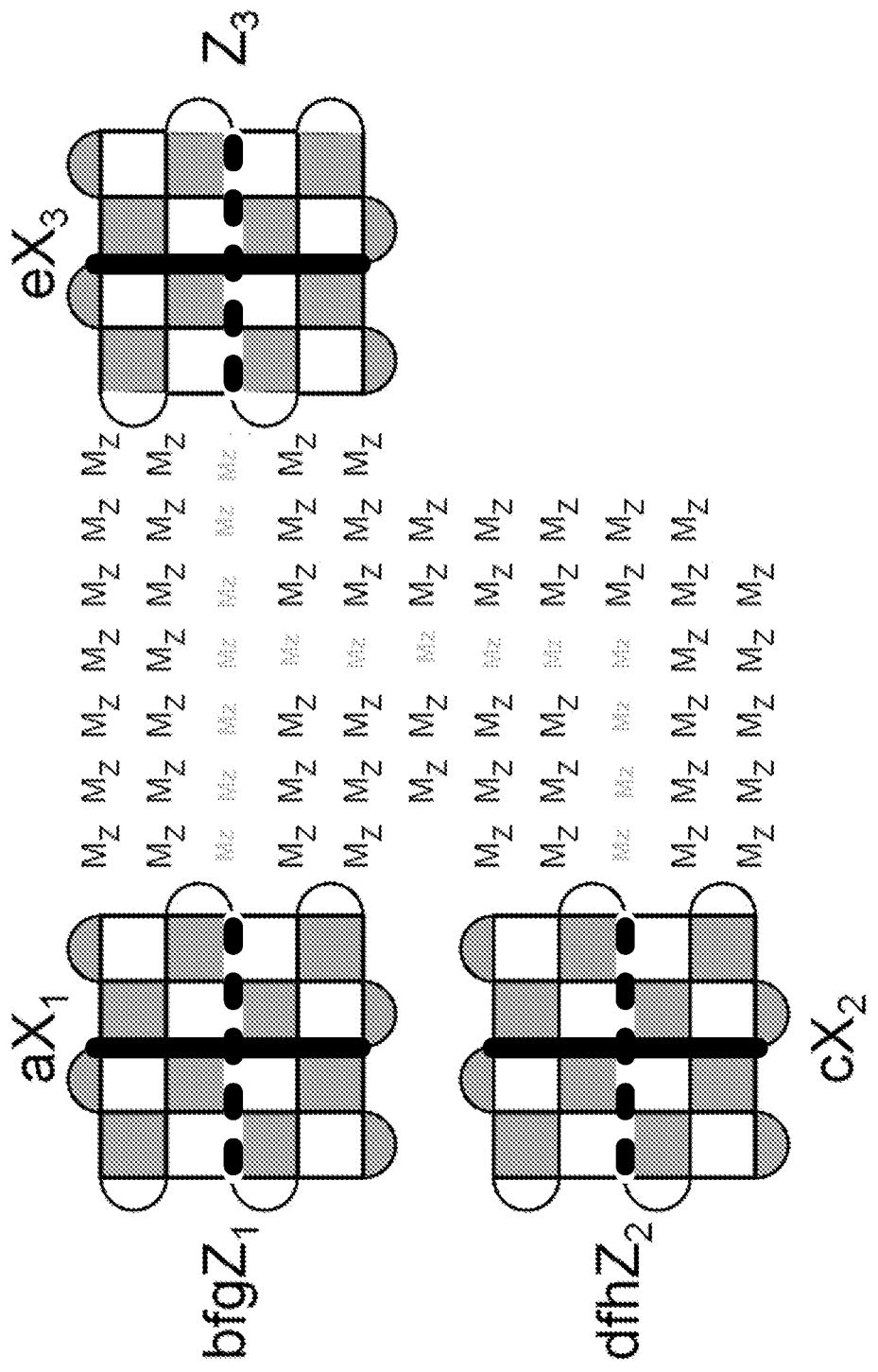

FIGS. 8A-8C illustrate an example process for compactly measuring a multi-body logical operator $X_{123}=X_1X_2X_3$.

FIG. 8A corresponds to part of step 402 described above with reference to FIG. 4. In the example process, 69 physical qubits are located between 3 logical qubits are prepared in a zero state prior to merging, however in some implementations more or fewer physical qubits may be located between the 3 rotated logical qubits.

FIG. 8B corresponds to steps 404 and 406 described above with reference to FIG. 4. The product of the stabilizers marked by circles gives the eigenvalue of the tensor product of X operators along the vertical solid lines. The eigenvalue must then be modified by the current signs of tensor products of operators along these lines to give a target result. This pattern of stabilizers is measured d times.

FIG. 8C corresponds to step 408 described above with reference to FIG. 4. After splitting, the eigenvalue of the chain of measurements $M_z$ in grey connecting $Z_1$ to $Z_3$ is denoted by g, and the chain connecting $Z_2$ to $Z_3$ by h. The signs of the $Z_{13}$ and $Z_{23}$ operators are, for convenience, associated with $Z_1$ and $Z_2$.

Figure 9B:
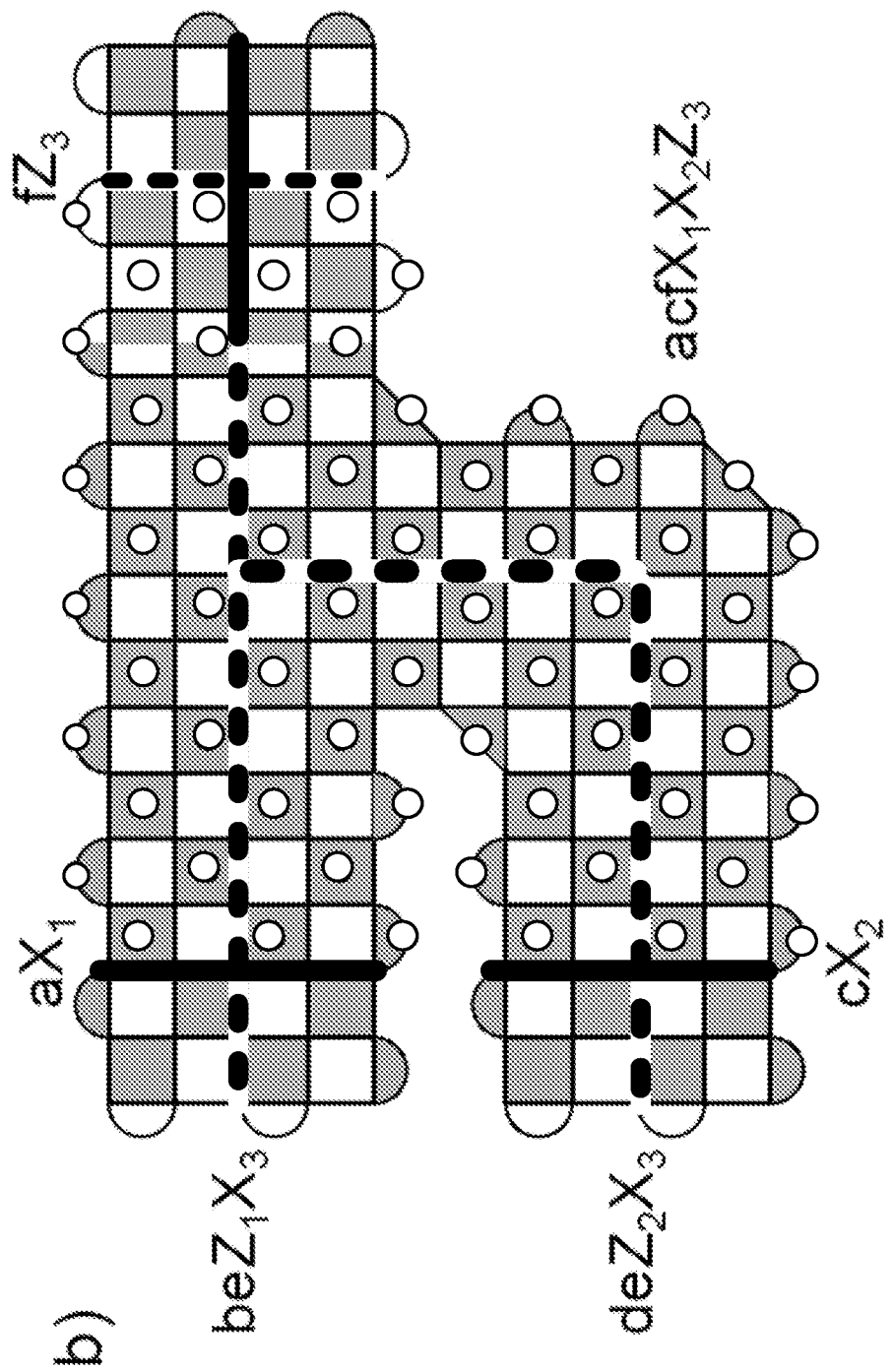
FIGS. 9A-9C illustrate an example process for compactly measuring a mixed multi-body logical operator $X_1X_2Z_3$.
Figure 9C:
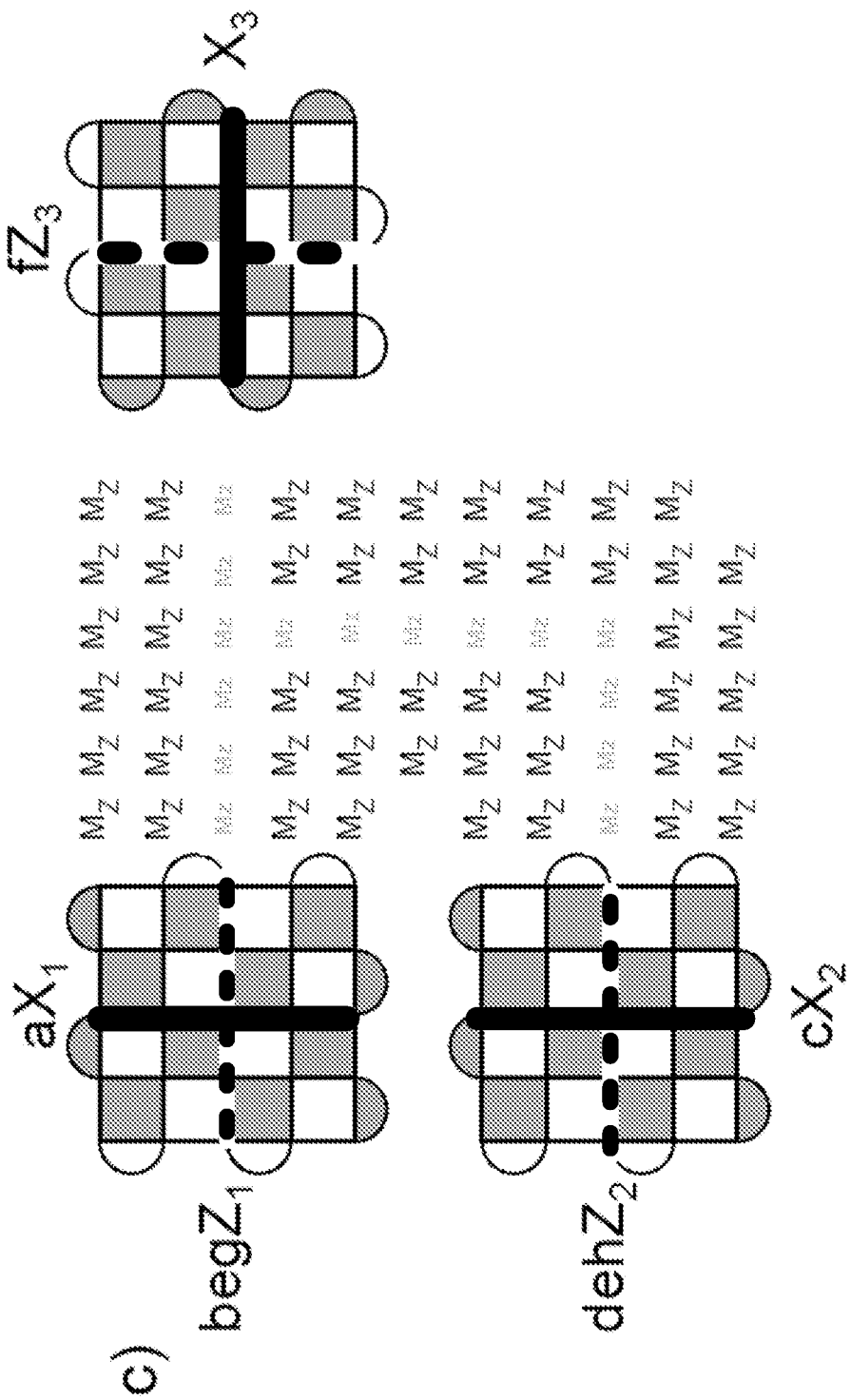
Figure 9A:
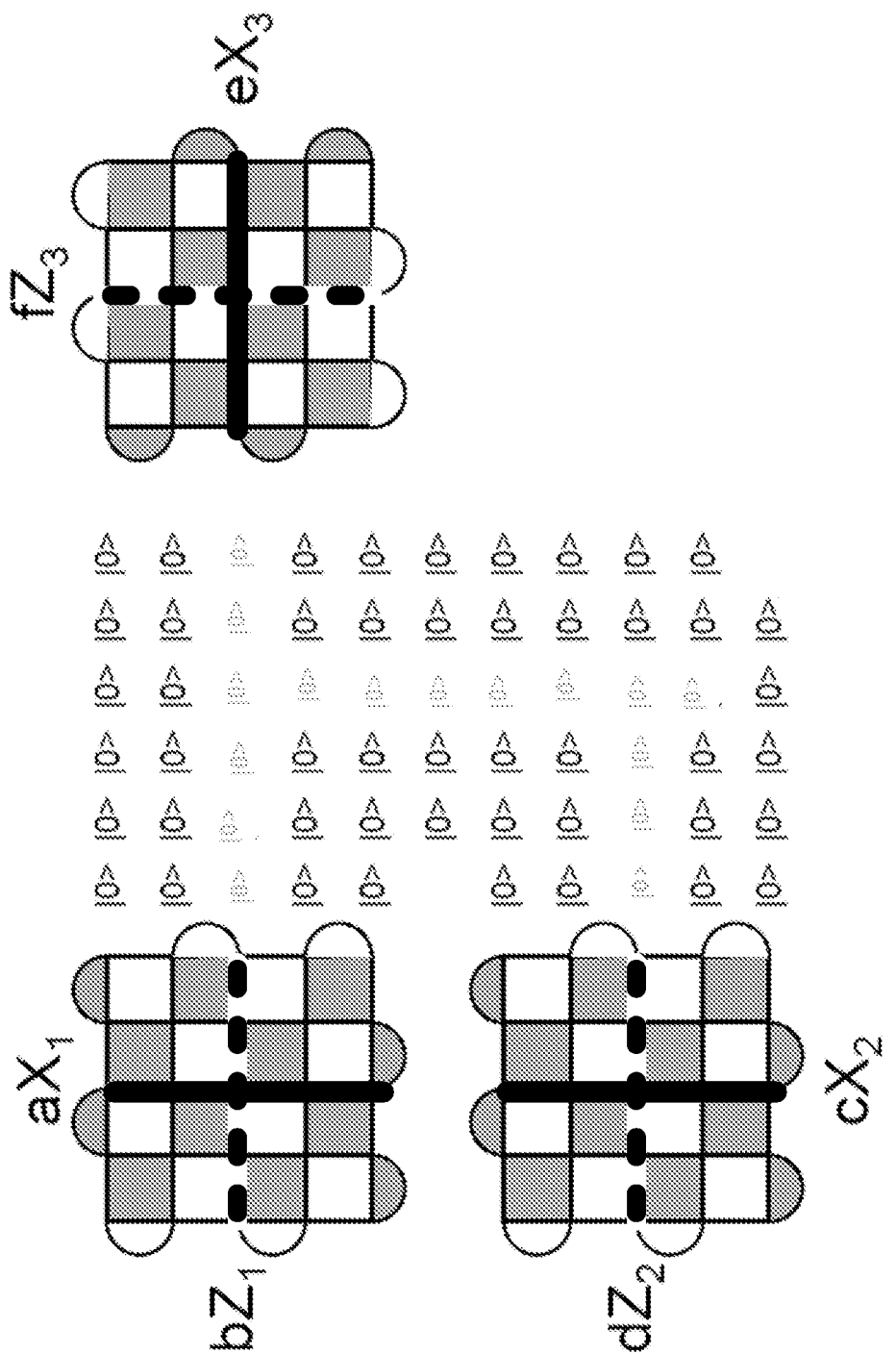

FIGS. 9A-9C illustrate an example process for compactly measuring a mixed multi-body logical operator $X_1X_2Z_3$.

FIG. 9A corresponds to part of step 402 described above with reference to FIG. 4. In the example process, 64 physical qubits are located between 3 logical qubits are prepared in a zero state prior to merging, however in some implementations more or fewer physical qubits may be located between the 3 rotated logical qubits.

FIG. 9B corresponds to steps 404 and 406 described above with reference to FIG. 4. The product of the stabilizers marked by circles gives the eigenvalue of the tensor product of $X_1X_2Z_3$ along the vertical solid lines. The eigenvalue must then be modified by the current signs of the individual operators along these lines to give a target result. This pattern of stabilizers is measured d times.

FIG. 9C corresponds to step 408 described above with reference to FIG. 4. After splitting, the eigenvalue of the chain of measurements $M_z$ in grey connecting $Z_1$ to $X_3$ is denoted by g, and the chain connecting $Z_2$ to $X_3$ by h. The signs of the $Z_1X_3$ and $Z_2X_3$ operators are, for convenience, associated with $Z_1$ and $Z_2$.

In some implementations, in applications of example process 400 applied to mixed multi-body operators, it may be necessary to rotate logical qubits when measuring the mixed multi-body operators.

Example Method for T State Distillation

Figure 10:
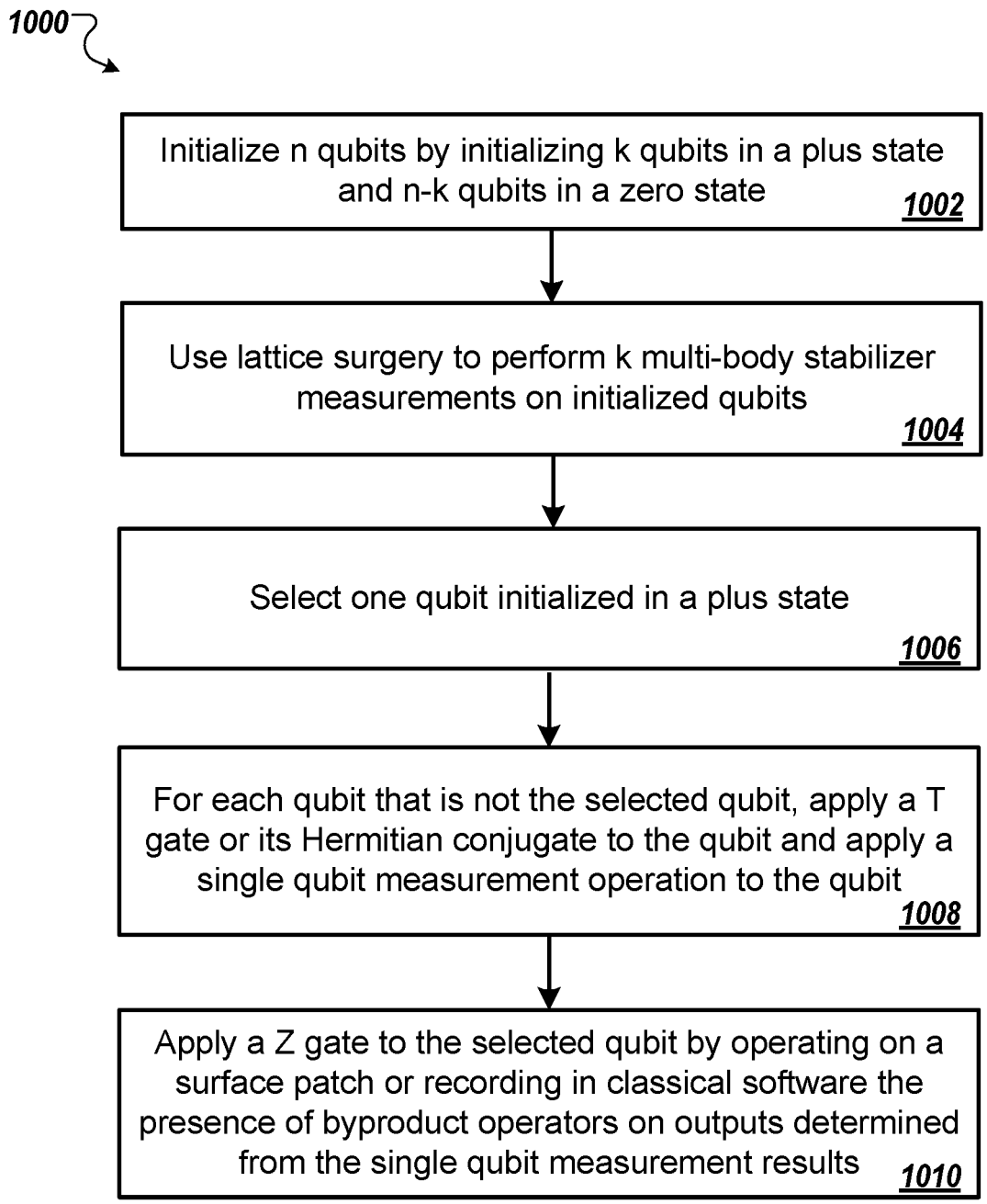
FIG. 10 is a flowchart of an example process for distilling one or more T states as part of an arbitrary quantum algorithm.

FIG. 10 is a flowchart of an example process 1000 for distilling one or more T states as part of an arbitrary quantum algorithm, e.g., a Clifford+T algorithm. For convenience, the process 1000 will be described as being performed by a system of one or more classical and quantum computing devices located in one or more locations.

The system initializes multiple qubits (step 1002). The multiple qubits can include logical qubits, e.g., the rotated logical qubits described in the present disclosure. The multiple qubits can be arranged according to the arrangement described in the present disclosure, e.g., according to the arrangement shown in example apparatus 100 of FIG. 1, for which the method is particularly suited.

Initializing the multiple qubits includes initializing a nonzero strict subset of the multiple qubits, e.g., k qubits, in a plus state and initializing the remaining qubits, e.g., n–k qubits, in a zero state.

The system uses lattice surgery to perform multiple multi-body stabilizer measurements on the initialized qubits (step 1004). Lattice surgery is a known term for "splitting" and "merging" planar code lattices in the surface code—see, for example, "Surface code quantum computing by lattice surgery" (Horsman et al., 2012 New J. Phys. 14 123011), the contents of which are incorporated by reference (in particular, section three of the paper). Discontinuous deformations of the lattice are used to implement the surface code. Lattice merging comprises combining two code surfaces to become a single surface, for example by measuring joint stabilizers across boundaries of the two surfaces during error correction cycles. Lattice splitting comprises cutting a single code surface into two surfaces, for example by cutting/removing joint stabilizers along a desired boundary between the split surfaces. Each multi-body stabilizer measurement is defined by a respective column of CNOT gates in a T state distillation circuit. Using lattice surgery to perform multiple multi-body stabilizer measurements on the initialized qubits can include performing any one of the lattice surgery techniques described in this specification, e.g., example process 400 for measuring an n-body operator or variations thereof.

The system selects one of the qubits from the qubits initialized in a plus state (step 1006). For each qubit that is not the selected qubit, the system applies a T gate or its Hermitian conjugate to the qubit and applies a single qubit measurement operation to the qubit (step 1008). Applying a T gate or its Hermitian conjugate to the qubit can include: obtaining an ancilla qubit in a T state; performing a 2-body ZZ measurement on the T state and the qubit; conditioned on the result of the ZZ measurement, performing an S gate or its Hermitian conjugate on the qubit; performing an X measurement on the ancilla qubit; and conditioned on the result of the X measurement, performing or classically recording the presence of a Z operation on the qubit.

The system applies a Z gate to the selected qubit by operating on a surface patch or recording in classical software the presence of byproduct operators on outputs determined from the single qubit measurement results (step 1010).

In some implementations the system can repeat the example process 1000 to perform repeated T state distillation, where in each repetition a corresponding T state distillation circuit is chosen such that a last column of CNOTs in a previous repetition slots into a first column of CNOTS for a current repetition.

Figure 11A:
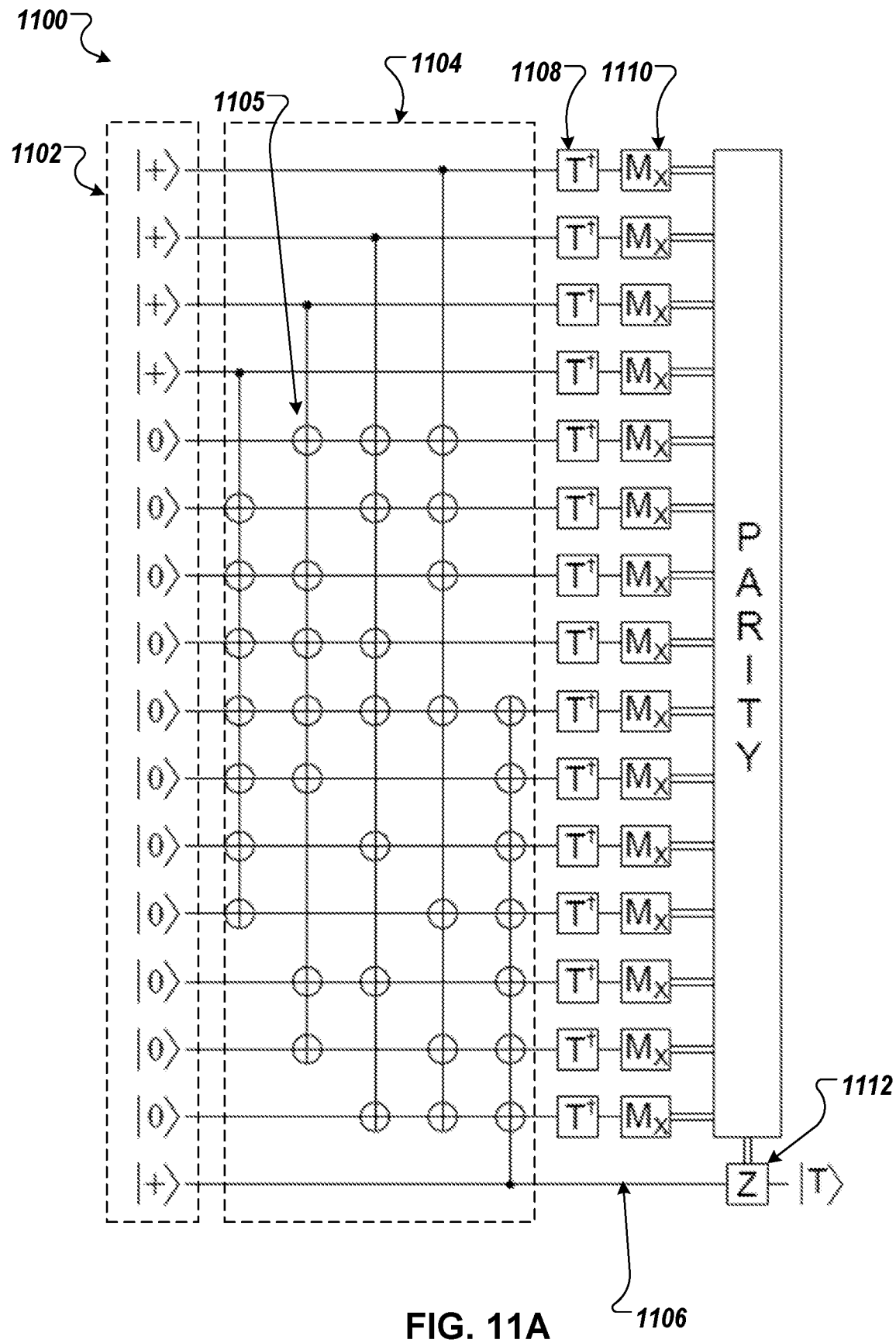
FIGS. 11A-11C shows three example quantum circuits for distilling one or more T states as part of an arbitrary quantum algorithm.
Figure 11B:
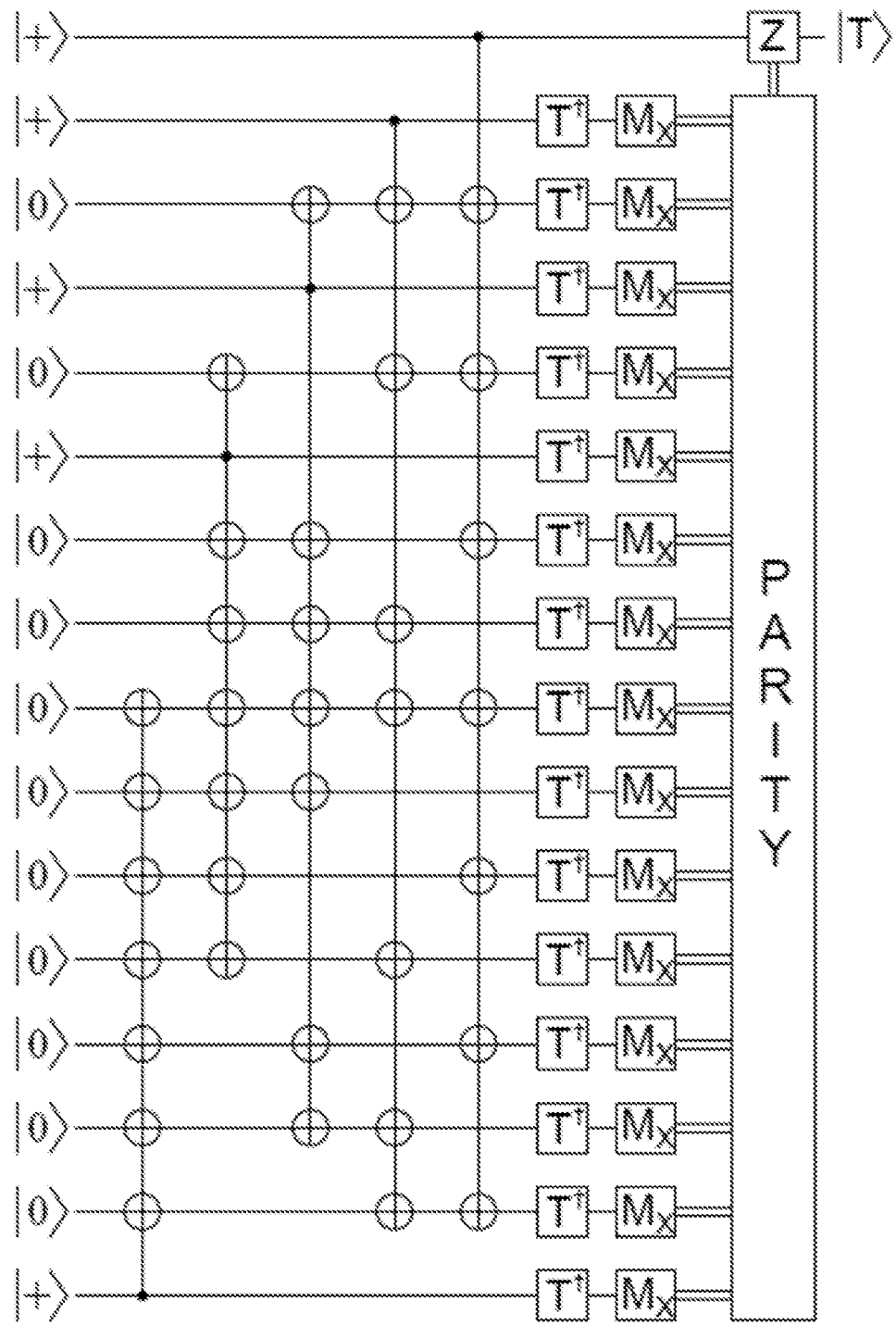
Figure 11C:
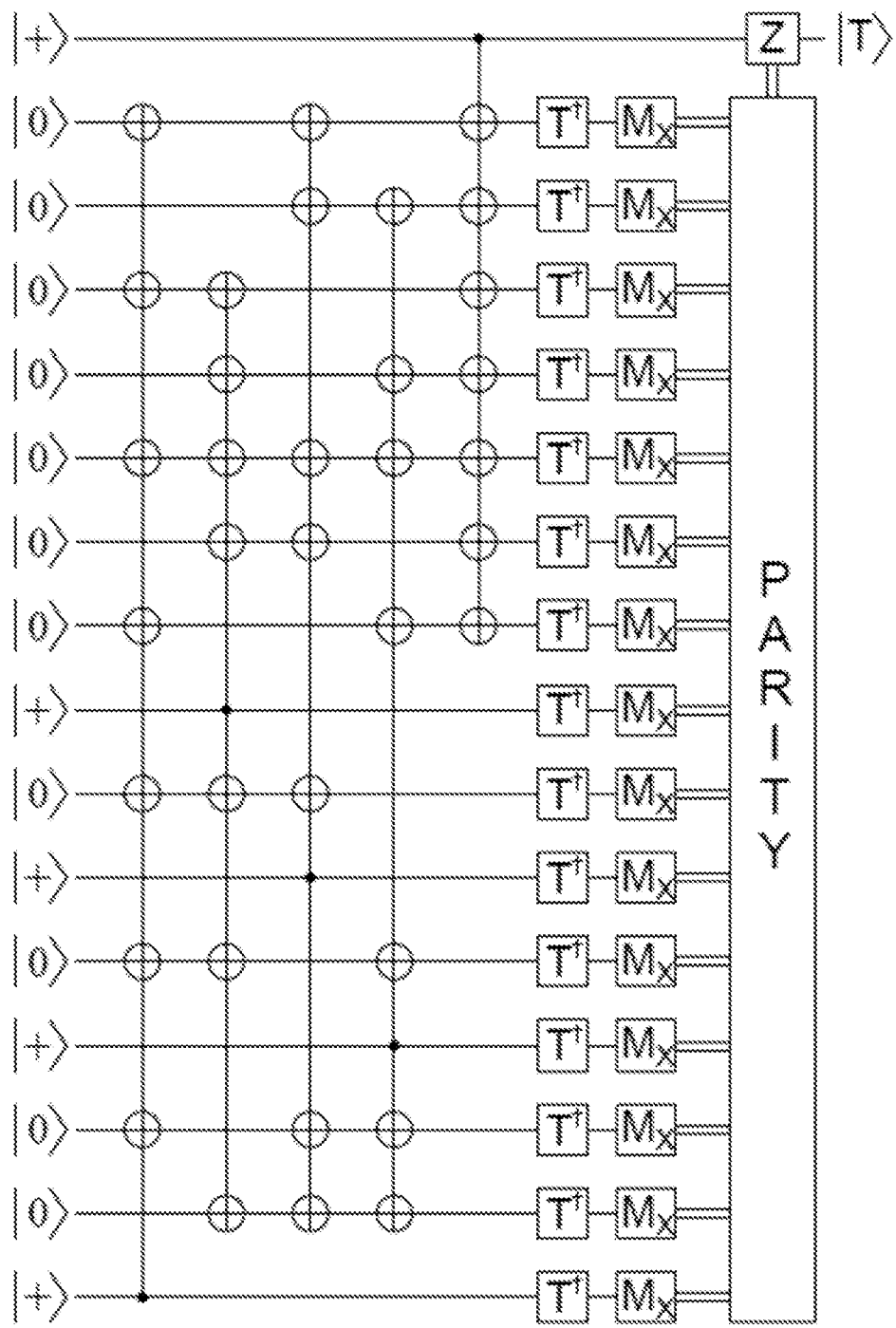

FIGS. 11A-C show three example quantum circuits 1100, 1120, 1130 for distilling one or more T states as part of an arbitrary quantum algorithm.

FIG. 11A shows a register of qubits 1102, where each qubit in the register of qubits is initialized in either a plus state or a zero state. In example quantum circuit 1100 the register of qubits 1102 includes n=16 qubits, where k=5 qubits are initialized in a plus state and n−k=11 qubits are initialized in a zero state.

Example quantum circuit 1100 includes multiple columns of CNOT gates. The first four columns of CNOTs, e.g., CNOT 1105, prepare a superposition of computational basis states, each of which has either eight or zero is in it. In other words, each column of CNOTs modifies the initial state of the qubits on which the column operates such that it has an additional stabilizer generator corresponding to X on the control and every target.

The 8-body X stabilizer generator measurements can be constructed such that the various patterns of Xs that touch the top fifteen qubits uniquely correspond to every binary number from 1 to 15. This enables a single Z error after state preparation to be located, and arbitrary pairs of Z errors to be detected. This state can be considered logical |0⟩ of a distance 3 code.

The fifth and final column of CNOTs corresponds to the controlled application of logical X, meaning the superposition $(|0_L\rangle+|1_L\rangle)/\sqrt{2}$ is prepared. In other words, given the sixteenth qubit (i.e., the qubit selected at step 1006 of example process 1000), the quantum state $(|0_L\rangle|0\rangle+|1_L\rangle|1\rangle)/\sqrt{2}$ prepared. States in $|1_L\rangle$ contain fifteen or seven 1s.

The number of 1s in $|0_L\rangle$ and $|1_L\rangle$ implies that applying transversal $T^\dagger$ will result in the quantum state $(|0_L\rangle|0\rangle+e^{i\pi/4}|1_L\rangle|1\rangle)/\sqrt{2}$. Z errors during the $T^\dagger$ gates can then be detected by measuring each qubit in the X basis, as the eigenvalues of the four X stabilizer generators can be reconstructed by taking the appropriate product of X measurements. If any generator has a negative eigenvalue, the sixteenth qubit is discarded.

If the probability of a Z error during $T^\dagger$ is p, the probability of rejection is approximately 15p. The collective effect of the X measurements is a logical X measurement which cuts the output down to $|T\rangle=(|0\rangle+e^{i\pi/4}|1\rangle)/\sqrt{2}$ up to a possible Z correction. Thirty-five combinations of three Z errors are undetectable and lead to an erroneous output of Z|T⟩, hence the input-output error relationship $p_o=35p_i^3$.

The fifth and final column of CNOTs is structurally identical to the first four columns, meaning it can be considered the fifth stabilizer generator of a 16-qubit code. This suggests an efficient method of preparing this state using lattice surgery, namely the direct measurement of the five stabilizer generators.

Figure 12:
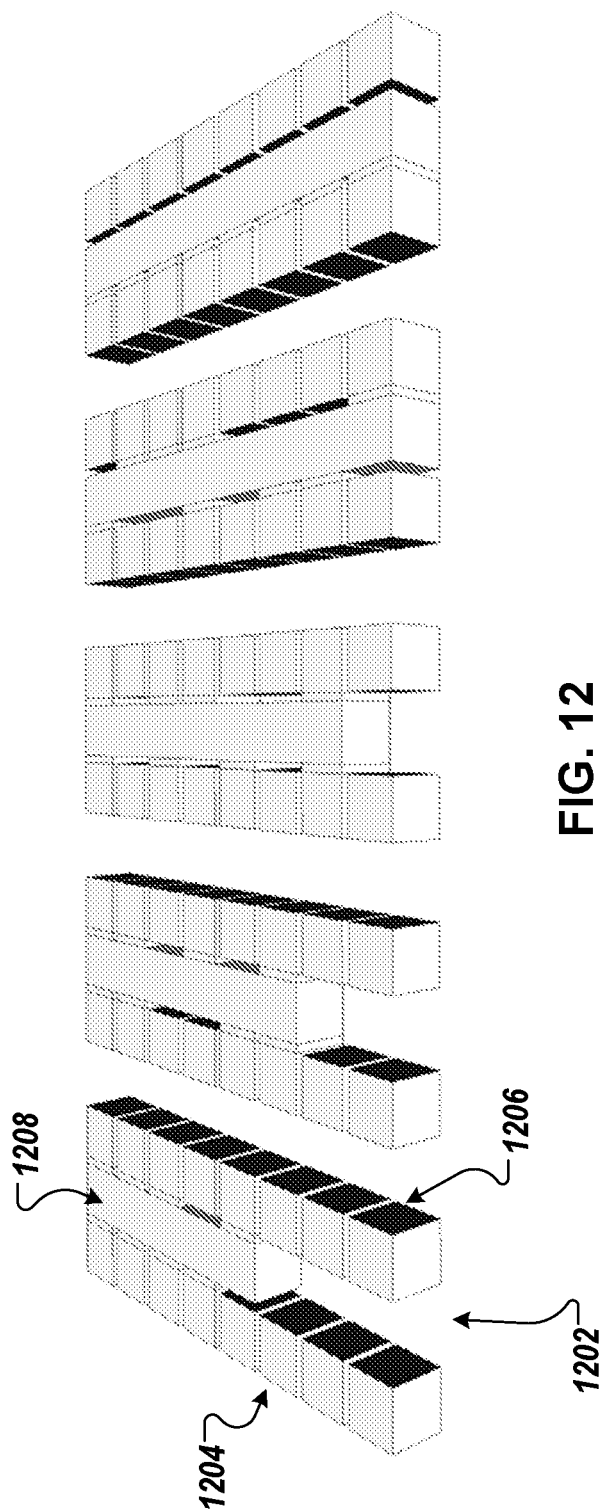
FIG. 12 illustrates example structures for direct measurement of stabilizer generators.

FIG. 12 illustrates an example of such measurements. FIG. 12 shows five structures, e.g., structure 1202, corresponding to the 5 columns of CNOTs in FIG. 11A. Instead of implementing CNOTs, the same state can be prepared with multi-body X measurements. In each structure the left eight blocks, e.g., including block 1204, correspond to the lower eight qubits in the qubit register, and the right eight blocks, e.g., including block 1206, correspond to the upper eight qubits in the register (in reverse order so that the top qubit is the bottom right block 1206). The element in the center of each structure, e.g., element 1208, performs the appropriate multi-body X measurement.

Returning to FIG. 11A, after preparing the 16-qubit state, fifteen of these qubits can be half-distance rotated and ZZ operators can be measured with an expanded output of multi-attempt state injection. To repeat state distillation, at least 16 first-level |T⟩ states need to be prepared to reliably obtain 15 inputs given the $15p_i$ failure rate. For a second level of distillation, two example quantum circuits shown in FIG. 13 can be used. The quantum circuit 1302 shown in part a) implements a T gate. To perform the T gate on an input state ψ a two-body Z measurement 1304 is performed on the input state and a T state. An S gate is then performed on the input state if the measurement result from the measurement operation 1304 produces a 1. An X measurement 1306 is performed on the T state (after the two body Z measurement is performed) and a Z gate is performed on the input state if the measurement result from the measurement operation 1306 produces a 1. The quantum circuit 1308 shown in part b) implements a $T^\dagger$ gate. To perform the $T^\dagger$ gate on an input state ψ a two-body Z measurement is performed on the input state and a T state. An $S^\dagger$ gate is then performed on the input state if the measurement result from the two body measurement operation produces a 0. An X measurement is performed on the T state (after the two body Z measurement is performed) and a Z gate is performed on the input state if the measurement result from the X measurement operation produces a 1.

Figure 13:
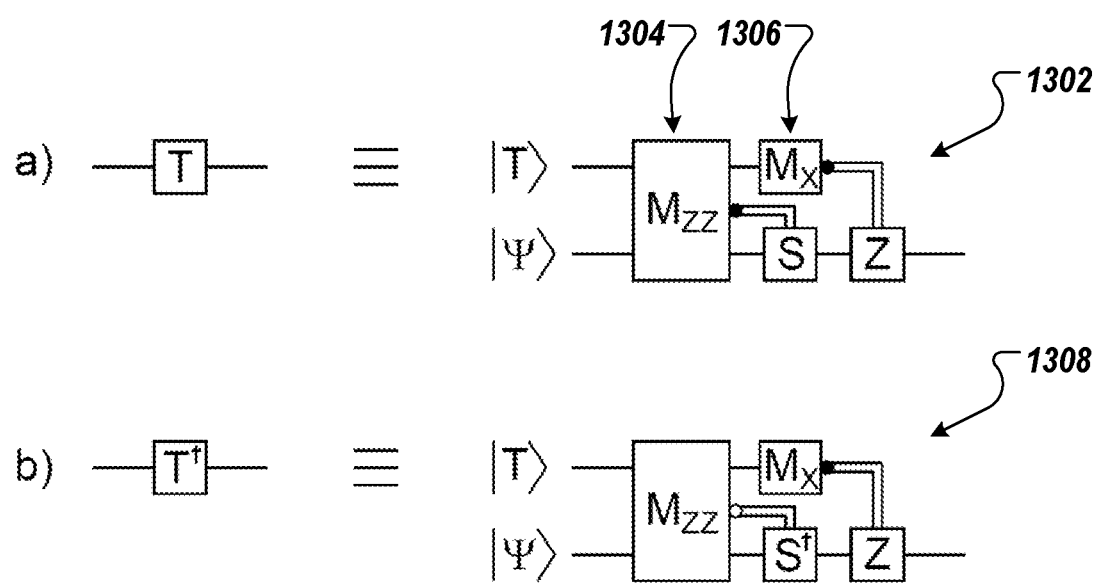
FIG. 13 shows two example quantum circuits.

The two example circuits in FIG. 13 are designed such that a last round of CNOTs of circuit a) slots into a first round of CNOTs of b), and a last round of CNOTS of b) slots into a first round of CNOTs of a). This property ensures that the lattice surgery versions of these circuits fit snuggly together, reducing the overall height and therefore time of execution.

FIGS. 11B and 11C show respective example quantum circuits for distilling one or more T states. The components and notation used in FIGS. 11B and 11C are the same as that used in FIG. 11A. In addition, the quantum circuits shown in FIGS. 11B and 11C are identical to the quantum circuit shown in FIG. 11A and to each other, up to qubit permutation.

Figure 14:
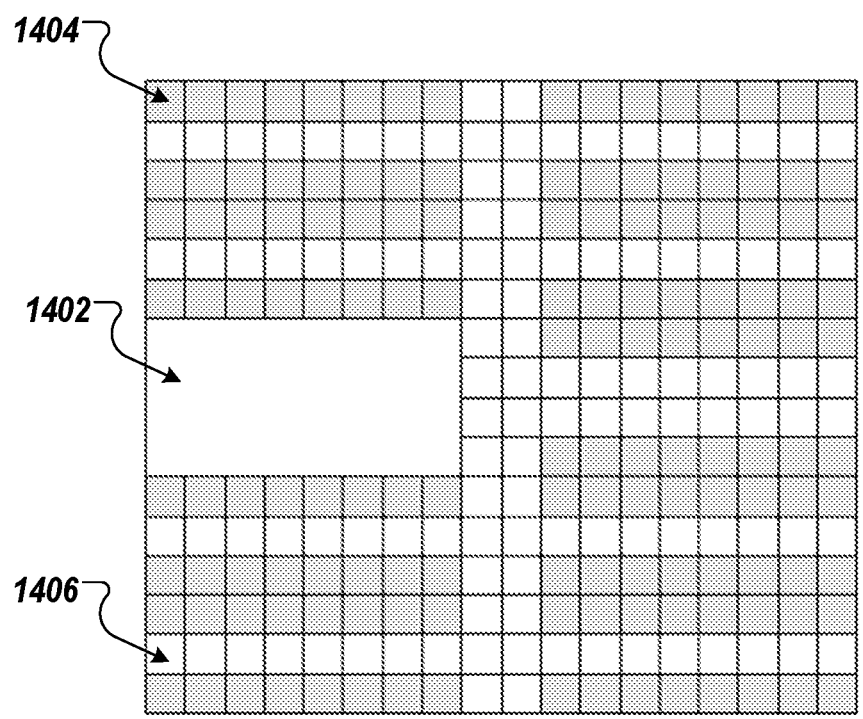
FIG. 14 shows an example layout of an algorithm for a single level of state distillation

FIG. 14 shows an example layout of an algorithm for a single level of state distillation. The large open rectangle 1402 represents the state distillation. Data logical qubits are represented by shaded squares, e.g., square 1404. Ancilla logical qubits for communication and interaction are represented by white squares, e.g., square 1406.

Example Method for Performing a Hadamard Gate

The logical Hadamard gate, being a Clifford gate, can in principle be performed entirely in classical processing, by simply relabeling the logical X and Z operators. When using lattice surgery, this comes at the cost of occasionally needing to double the size of the logical qubit, and being able to measure logical Y operators, which doubles the size again. Furthermore, physical-level stabilizer measurements of weight greater than 4 and structure that may or may not be suitable for the underlying hardware are required.

Figure 15:
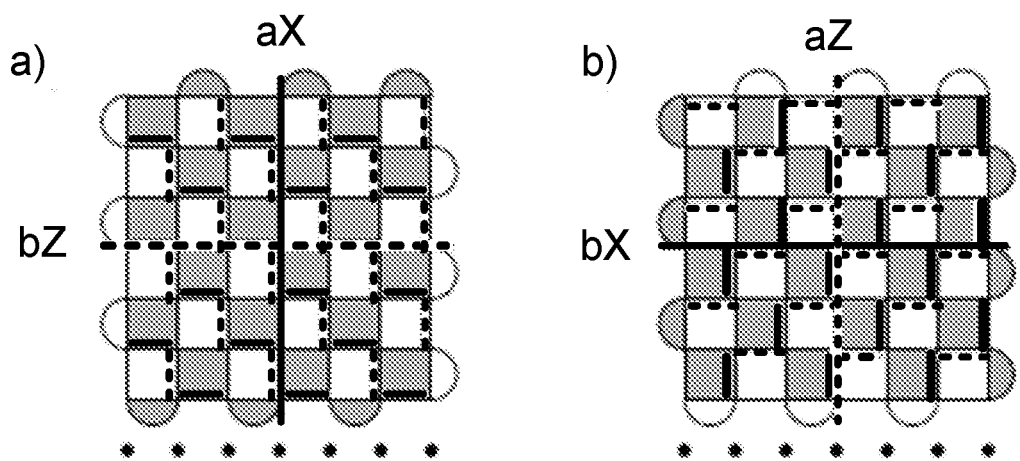
FIGS. 15 and 16 illustrate an example process for performing a Hadamard gate.
Figure 15:
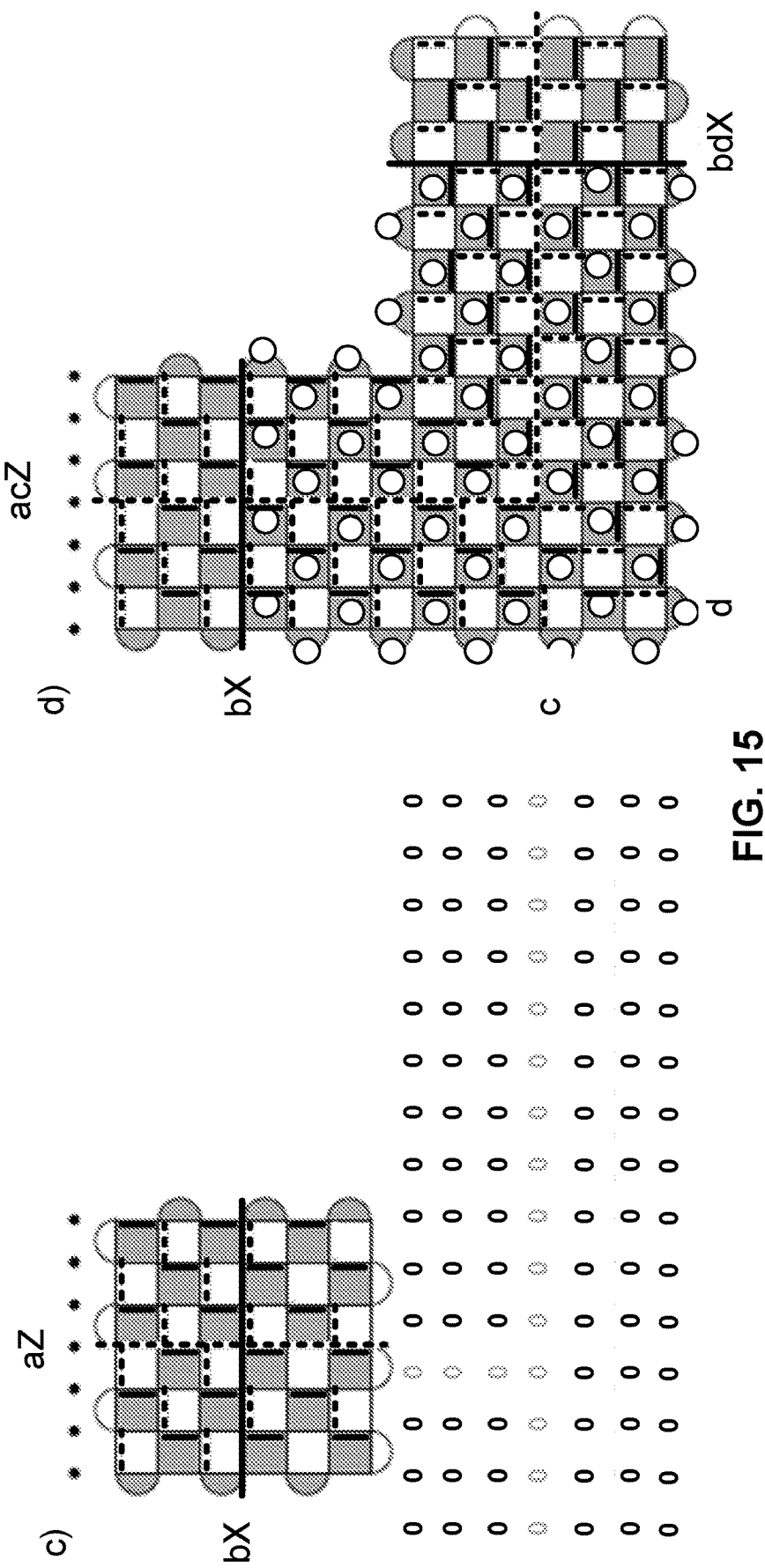
Figure 15:
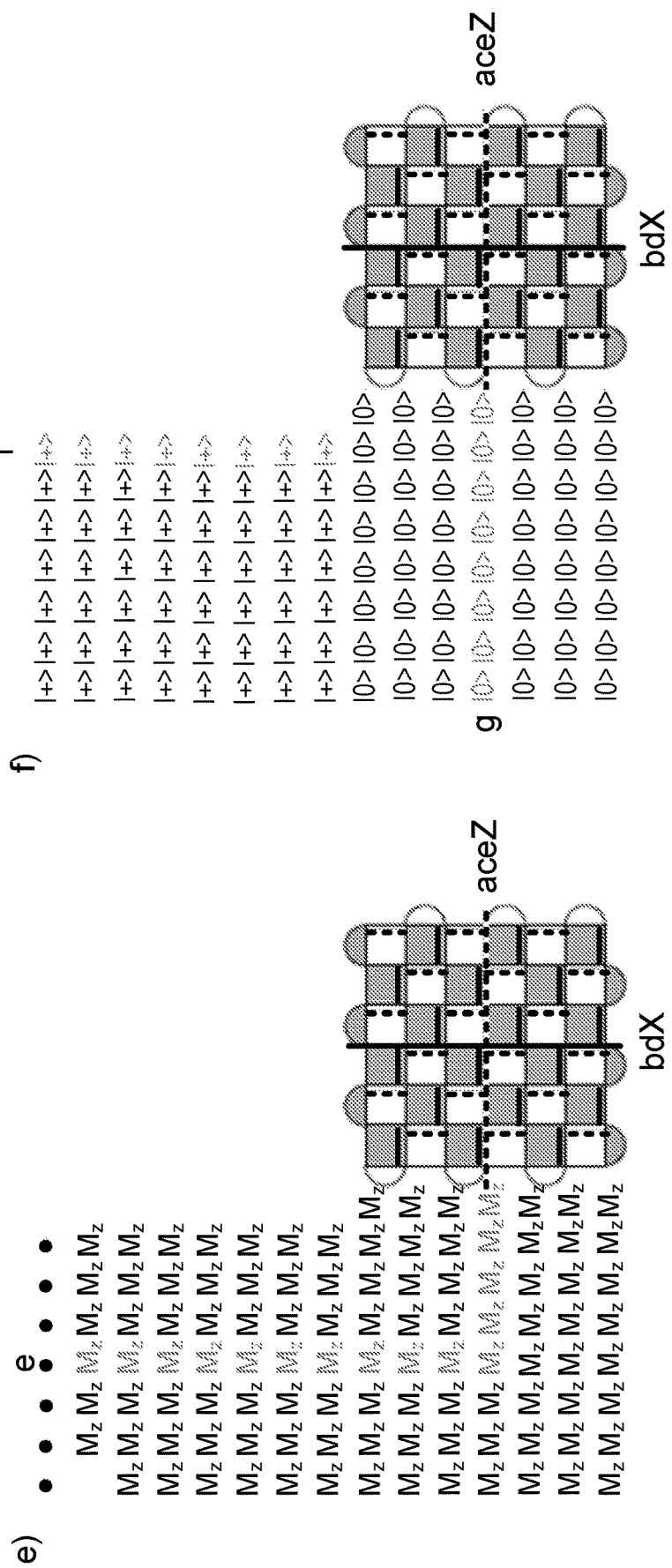
Figure 16:
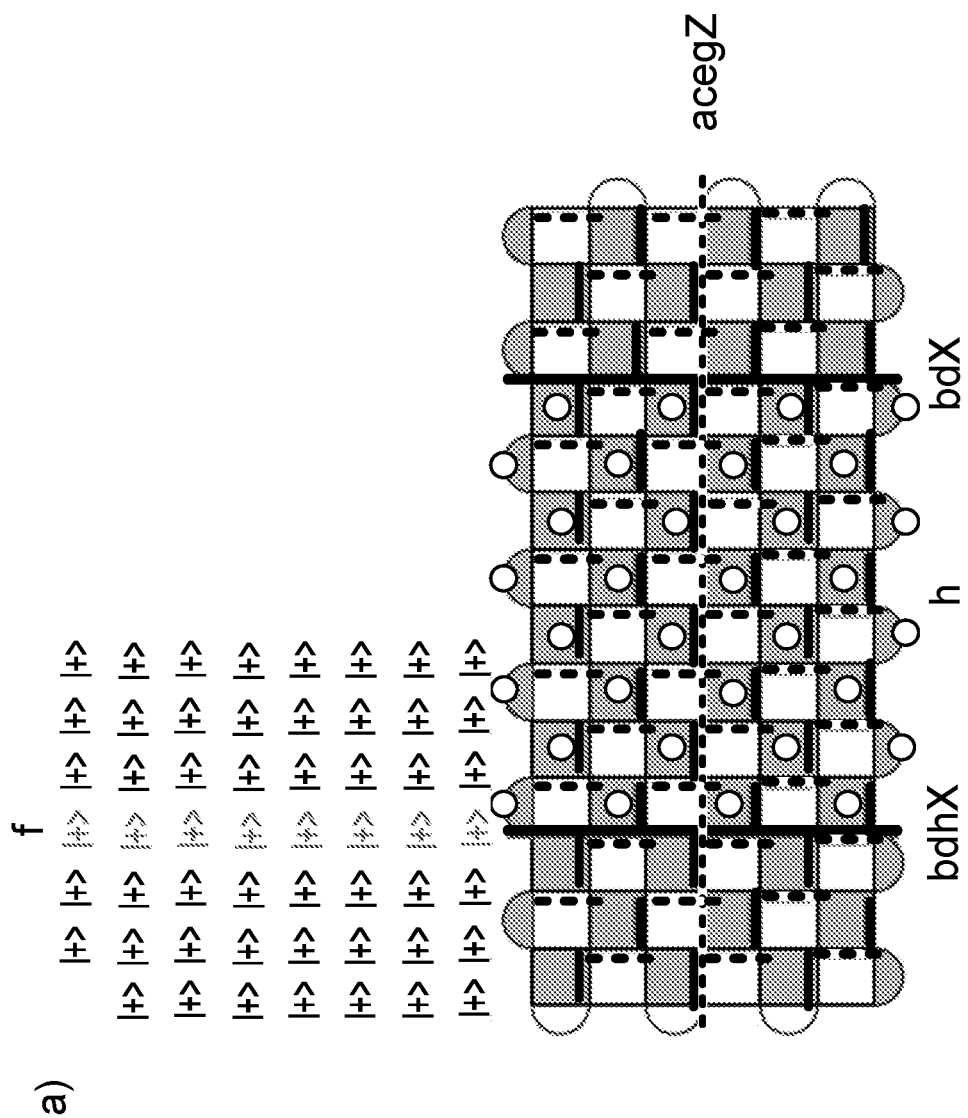
Figure 16:
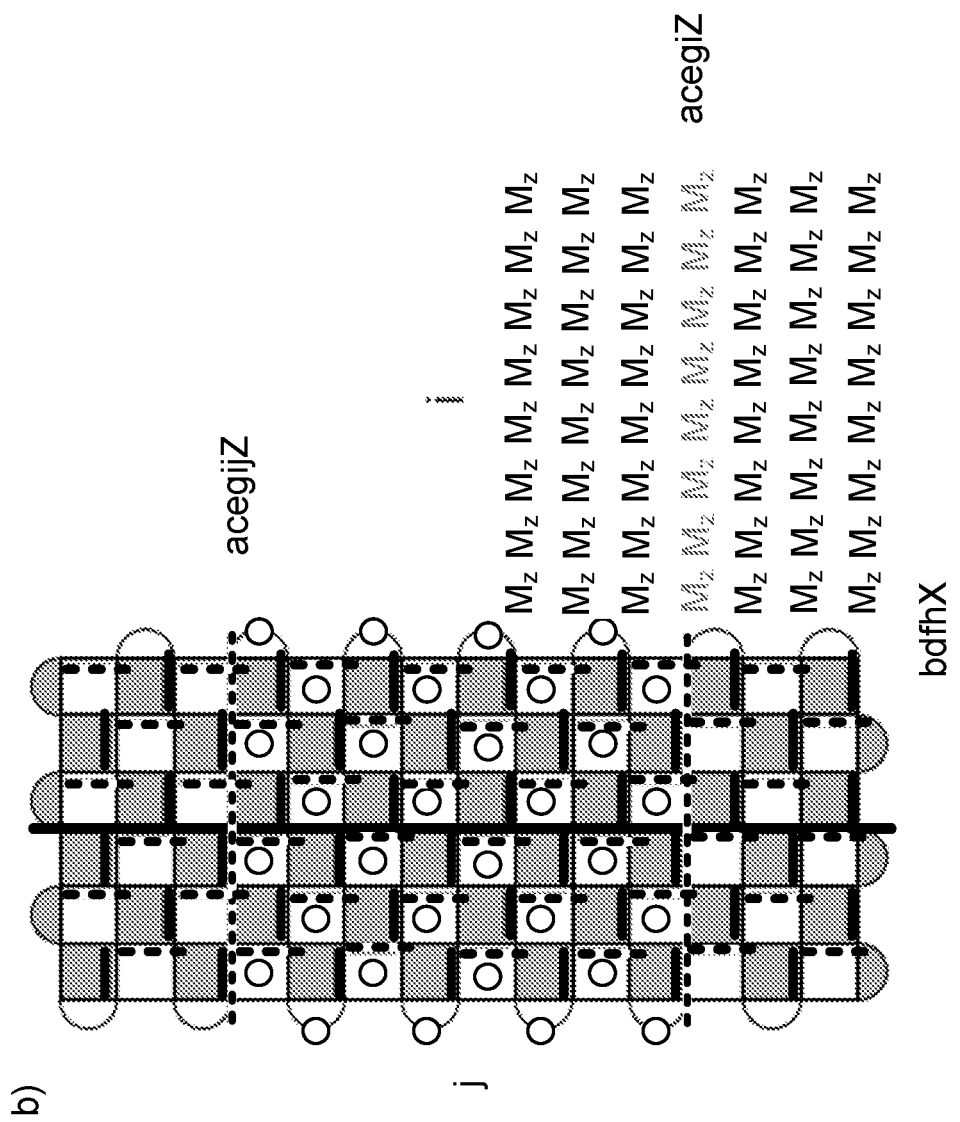
Figure 16:
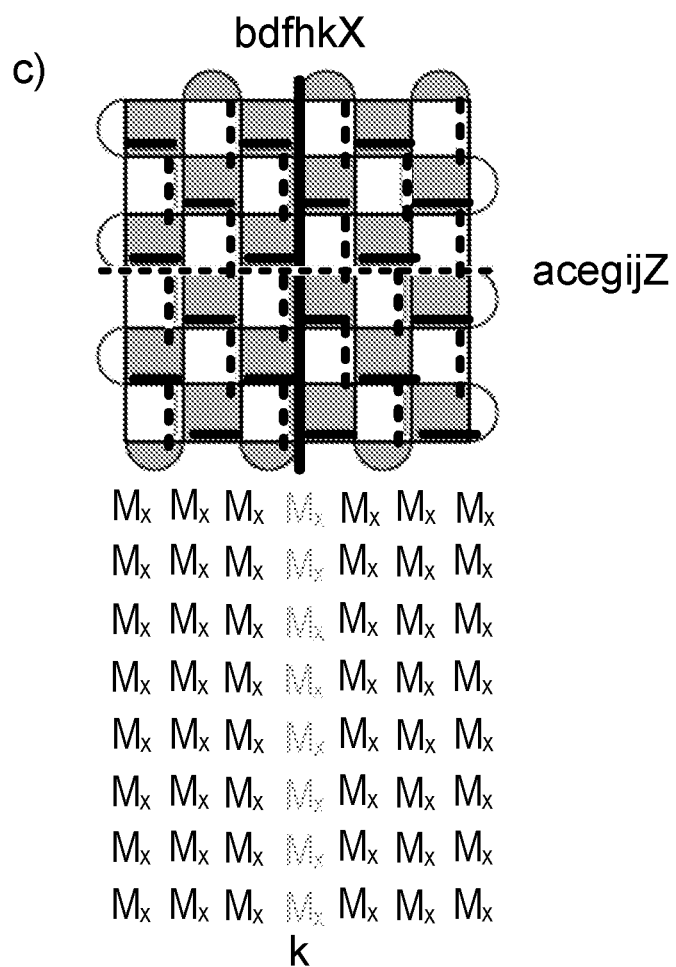

FIGS. 15 and 16 illustrate an example process for performing a Hadamard gate that does not change the definitions of the logical operators and uses simple underlying circuits. The components and notation used in FIGS. 15 and 16 are the same as that used in FIGS. 2 to 8.

In FIG. 15, step a) shows a rotated logical qubit in an initial state. Step b) shows the state of the rotated logical qubit after a transversal Hadamard is performed. Step c) shows the state of the rotated logical qubit after a downwards swap and in preparation to expand the rotated logical qubit. Step d) shows an expanded logical qubit. The orientation of circuits around the corner ensure the full code distance is preserved. Circles show how to move the logical X operator using the product d of stabilizers. Step e) shows a contraction of the rotated logical qubit. Step f) shows an initialization of the way back to the original position. This and subsequent steps could be omitted if a return to the original position is not required.

FIG. 16 shows the movement of the logical qubit back to its original position. Step a) shows movement of a logical X operator and requires d steps (where d represents code distance). Step b) shows the trimming and movement of a logical Z operator. Step c) shows the trimming of the logical X operator. In some implementations steps b) and c) can be performed simultaneously. Parts b) and c) require, in total, d steps.

Example Method for Performing a CNOT Gate, CZ Gate and a Swap.

Figure 17:
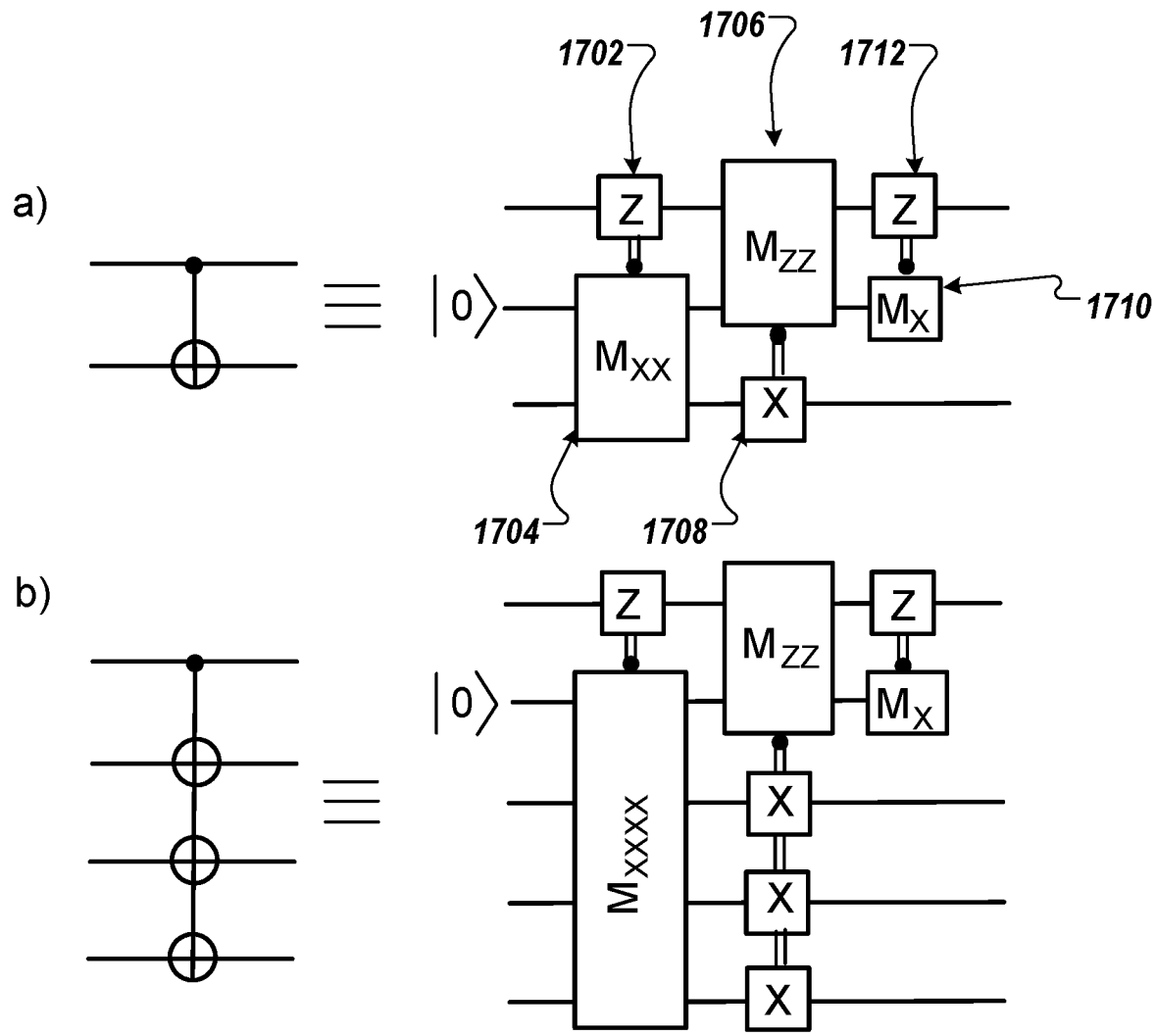
FIG. 17 shows an example quantum circuit for performing a CNOT gate.

CNOT gates are extremely common in many quantum algorithms. FIG. 17 shows an example quantum circuit for performing a CNOT gate. Part a) of FIG. 17 shows a lattice surgery implementation of CNOT. A two-body X measurement 1704 is performed on a target qubit (for the CNOT gate) and a first ancilla qubit initialized in a 0 state. If the measurement produces a 1, a Z gate 1702 is applied to a second ancilla qubit. A two-body Z measurement 1706 is performed on the first ancilla qubit and the second ancilla qubit 1704. If the measurement produces a 1, an X gate 1708 is applied to the target qubit. An X measurement 1710 is performed on the first ancilla qubit. If the measurement produces a 1, a Z gate 1712 is applied to the second ancilla qubit.

Part b) of FIG. 17 shows an extension to single-control multiple-target CNOT. The notation of part b) of FIG. 17 is the same as that used in part a), where $M_{XXXX}$ represents a four body X measurement. The total time required to perform a CNOT is 2d as the ancilla initialization and measurement can both be performed transversely.

Figure 18:
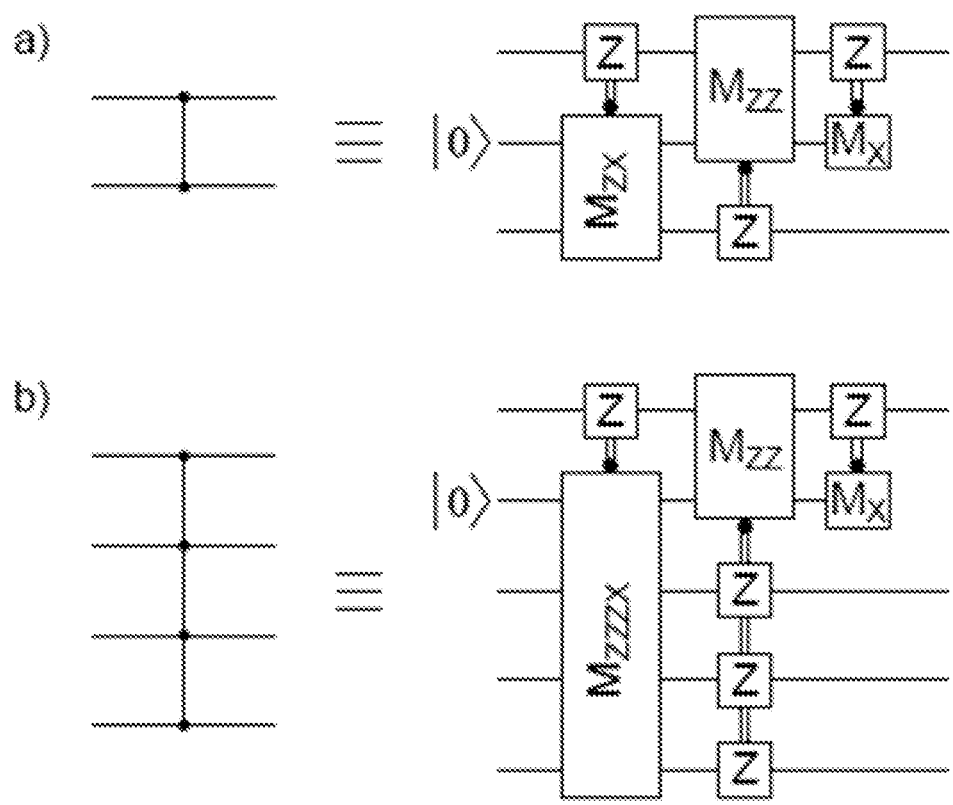
FIG. 18 shows an example quantum circuit for performing a CZ gate.

The CNOT gate described in FIG. 17 can be modified to create a CZ gate by changing one of the operators being measured, as shown in FIG. 18. In FIG. 18, part a) shows a lattice surgery implementation of CZ. Part b) shows an extension to single-control multiple-target CZ. The notation in FIG. 18 is the same as that used in FIG. 17, where $M_{ZZZX}$ represents a four body ZZZX measurement.

Figure 19:
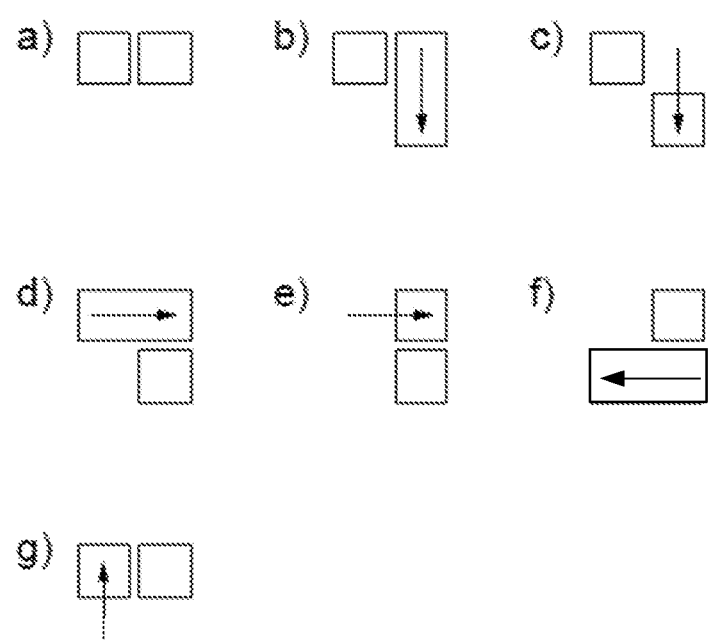
FIG. 19 illustrates how logical qubits can be moved around one another using a series of single logical qubit moves.

FIG. 19 illustrates how logical qubits can be moved around one another using a series of single logical qubit moves. Part a) shows an initial configuration. Parts b)-c) show an example downward movement, d error detection rounds. Parts d)-e) show rightward movement, d error detection rounds. Parts f)-g) show a return movement using the techniques in FIG. 16, a final d error detection rounds for a total of 3d.

Example Hardware

Figure 20:
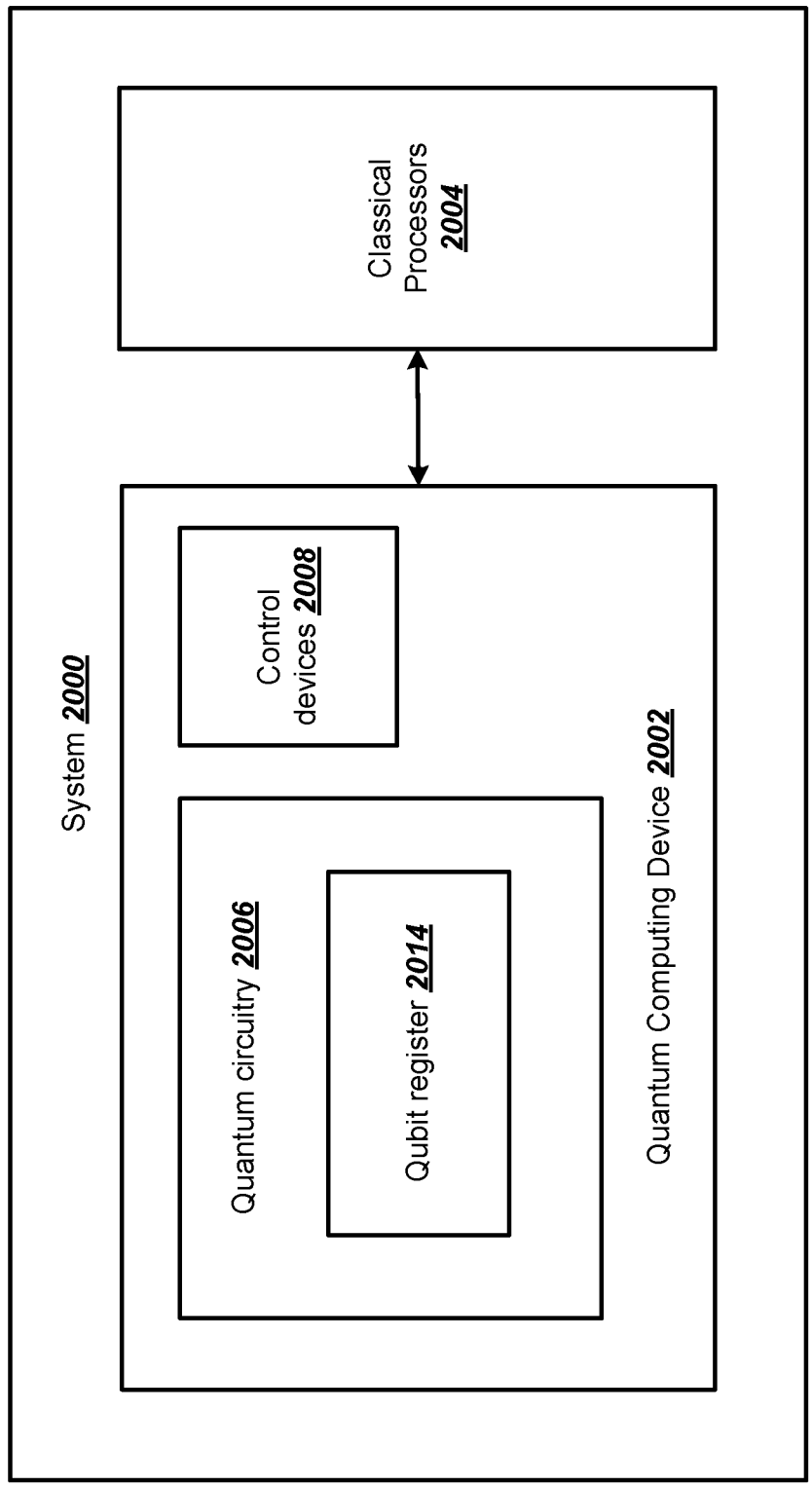
FIG. 20 shows an example system.

FIG. 20 depicts an exemplary system 2000. The system 2000 is an example of a system implemented as quantum and/or classical computer programs on one or more quantum computing devices and/or classical computers in one or more locations, in which the systems, components, and techniques described in the present disclosure can be implemented.

The system 2000 includes a quantum computing device 2002 in data communication with one or more classical processors 2004. For convenience, the quantum computing device 2002 and classical processors 2004 are illustrated as separate entities, however in some implementations the one or more classical processors may be included in quantum computing device 2002.

The quantum computing device 2002 includes components for performing quantum computation. For example, the quantum computing device 2002 includes at least quantum circuitry 2006 and control devices 2008.

The quantum circuitry 2006 includes components for performing quantum computations, e.g., components for implementing the various quantum circuits and operations described with reference to FIGS. 1-19. For example, the quantum circuitry may include a quantum system that includes one or more multi-level quantum subsystems, e.g., a register of qubits 2014. The type of multi-level quantum subsystems that the system 2000 utilizes may vary. For example, in some implementations the multi-level quantum subsystems may be superconducting qubits, e.g., Gmon or Xmon qubits. In some cases it may be convenient to include one or more resonators attached to one or more superconducting qubits. In other cases ion traps, photonic devices or superconducting cavities may be used. Further examples of realizations of multi-level quantum subsystems include fluxmon qubits, silicon quantum dots or phosphorus impurity qubits.

Quantum circuits comprising different quantum logic operations, e.g., single qubit gates, two qubit gates, and three qubit gates such as NOT gates, CNOT gates, multi target CNOT gates, and logical AND operations, may be constructed using the quantum circuitry 2006. Constructed quantum circuits can be operated/implemented using the control devices 2008. The type of control devices 2008 included in the quantum system depend on the type of qubits included in the quantum computing device. For example, in some cases the control devices 2008 may include devices that control the frequencies of qubits included in the quantum circuitry 2006, an excitation pulse generator and control lines that couple the qubits to the excitation pulse generator. The control devices may then cause the frequency of each qubit to be adjusted towards or away from a quantum gate frequency of an excitation pulse on a corresponding control driveline. The control devices 108 may further include measurement devices, e.g., readout resonators. Measurement results obtained via measurement devices may be provided to the classical processors 2004 for processing and analyzing.

Implementations of the digital and/or quantum subject matter and the digital functional operations and quantum operations described in this specification can be implemented in digital electronic circuitry, suitable quantum circuitry or, more generally, quantum computational systems, in tangibly-embodied digital and/or quantum computer software or firmware, in digital and/or quantum computer hardware, including the structures disclosed in this specification and their structural equivalents, or in combinations of one or more of them. The term "quantum computational systems" may include, but is not limited to, quantum computers, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits, or a combination of one or more of them. Alternatively or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible.

The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, multiple digital and quantum processors or computers, and combinations thereof. The apparatus can also be, or further include, special purpose logic circuitry, e.g., an FPGA (field programmable gate array), an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers to be "configured to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum processors or both, or any other kind of central digital and/or quantum processing unit. Generally, a central digital and/or quantum processing unit will receive instructions and digital and/or quantum data from a read-only memory, a random access memory, or quantum systems suitable for transmitting quantum data, e.g. photons, or combinations thereof.

The essential elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more non-transitory machine-readable storage media, and that are executable on one or more digital and/or quantum processing devices. The systems described in this specification, or portions of them, can each be implemented as an apparatus, method, or system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. An apparatus for implementing an arbitrary quantum algorithm, wherein the arbitrary quantum algorithm is made fault-tolerant using a surface code, the apparatus comprising:

one or more computers and one or more storage devices storing quantum computer program instructions that are operable, when executed by the one or more computers, to cause the one or more computers to control the operation of a quantum computer, the quantum computer comprising:

a multi-qubit lattice defining a plurality of qubit rows and plurality of qubit columns, comprising:

two or more separate row portions of rotated logical qubits, wherein each row portion of the rotated logical qubits is a proper subset of a qubit row that comprises one or more inactive qubits, each row portion comprising a plurality of rotated logical qubits that are each adjacent to each other, each rotated logical qubit comprising:

a plurality of data qubits, a plurality of measure qubits, a plurality of X stabilizers and a plurality of Z stabilizers interleaving the X stabilizers, wherein each stabilizer is associated with a respective measure qubit and data qubits are located at intersections between stabilizers in the multi-qubit lattice; and two boundaries that consist of X stabilizer measurements and two boundaries that consist of Z stabilizer measurements;

two or more separate row portions of inactive qubits, each row portion defining a plurality of inactive qubits; and two or more columns of inactive qubits across the qubit rows, the two or more columns defining a shared workspace for implementing multi-logical-qubit operations;

wherein:

each row portion of rotated logical qubits is adjacent to a row portion of inactive qubits;

the plurality of inactive qubits are inactive during implementation of the arbitrary quantum algorithm; and during implementation of the arbitrary quantum algorithm, the one or more computers cause the rotated logical qubits to be moved to the shared workspace and operated on in the shared workspace to perform multi-logical-qubit operations, wherein each rotated logical qubit is moved through the multi-qubit lattice using a series of single logical qubit moves, each move in the series requires d error detection rounds, where d represents a surface code distance that measures a strength of the surface code and represents a length of a smallest logical operator.

2. The apparatus of claim 1, wherein the plurality of data qubits comprise $d^2$ data qubits and the plurality of measure qubits comprise $d^2-1$ measure qubits.

3. The apparatus of claim 1, wherein the one or more rotated logical qubits are configured to be acted on locally.

4. The apparatus of claim 1, wherein the logical qubits are configured to be rotated in place.

5. The apparatus of claim 1, wherein the arbitrary quantum algorithm comprises a Clifford+T algorithm.

* * * * *